United States Patent [19]
Vallomy

[11] Patent Number: 6,155,333
[45] Date of Patent: Dec. 5, 2000

[54] CONTINUOUS ELECTRIC STEELMAKING WITH CHARGE PREHEATING, MELTING, REFINING AND CASTING

[75] Inventor: John A. Vallomy, Charlotte, N.C.

[73] Assignee: Techint Compagnia Tecnica Internazionale, Milan, Italy

[21] Appl. No.: 09/344,797

[22] Filed: Jun. 25, 1999

Related U.S. Application Data
[60] Provisional application No. 60/121,261, Feb. 23, 1999.

[51] Int. Cl.$^7$ ................................. C21C 5/52; C22B 7/00
[52] U.S. Cl. ......................... 164/476; 164/417; 266/901; 75/10.66
[58] Field of Search ..................................... 164/476, 477, 164/417, 469, 470, 508, 509; 75/10.6, 10.61, 10.63, 10.66, 10.38, 10.41; 266/901

[56] References Cited

U.S. PATENT DOCUMENTS

| | | | |
|---|---|---|---|
| 4,543,124 | 9/1985 | Vallomy | 373/60 |
| 4,836,732 | 6/1989 | Vallomy | 414/188 |
| 5,514,331 | 5/1996 | Honkaniemi et al. | 75/10.66 |

*Primary Examiner*—Kuang Y. Lin
*Attorney, Agent, or Firm*—Dougherty & Associates

[57] ABSTRACT

An improved method and apparatus for preheating, melting, refining and casting of steel. The apparatus has a variable length secondary belt conveyor positioned in a charging area for introducing minute charge materials or slag formers, a skirted self-positioning charging cart engaging the secondary conveyor, a charge conveyor for receiving charge material having a means for maintaining a homogeneous scrap bed height that is coupled to the self-positioning cart, a dynamic gas seal coupled to both the charge conveyor and a preheater, the preheater communicating with the charge conveyor for preheating the charge materials on the charge conveyor, a connecting car for feeding charge materials into a furnace bath that is removably coupled to the preheater and charge conveyor, an electric arc furnace for melting and refining metallic charge therein, at least one electrode sealing ring that is coupled to the electrodes of the furnace, a directly fed intermediate metallurgical vessel that receives the molten metal discharged from the furnace, and a continuous casting device that receives refined-alloyed steel from the intermediate metallurgical vessel. No ladle is used so that the furnace pours directly into the intermediate metallurgical vessel thereby eliminating the requirements for both a ladle and ladle handling equipment.

27 Claims, 16 Drawing Sheets

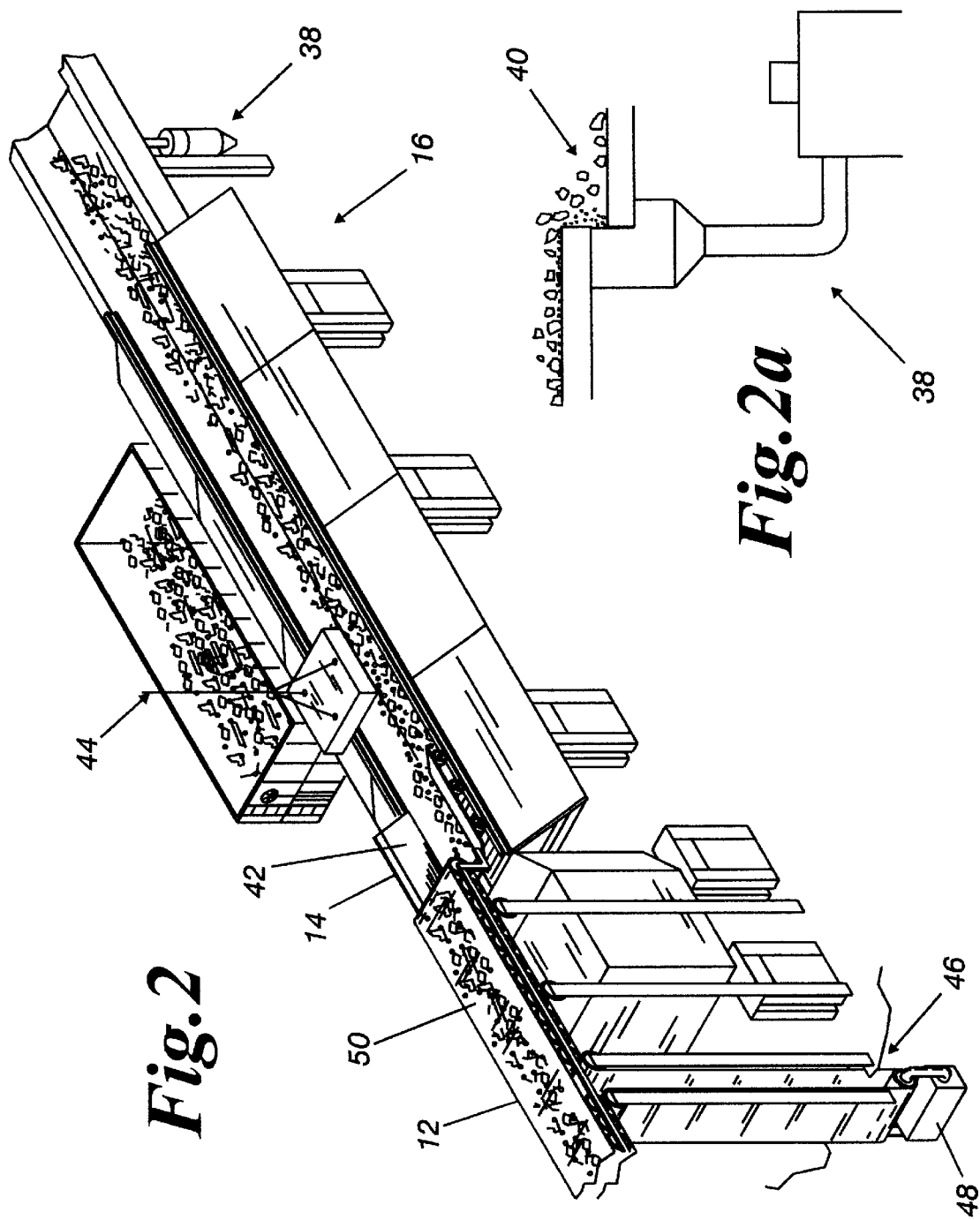

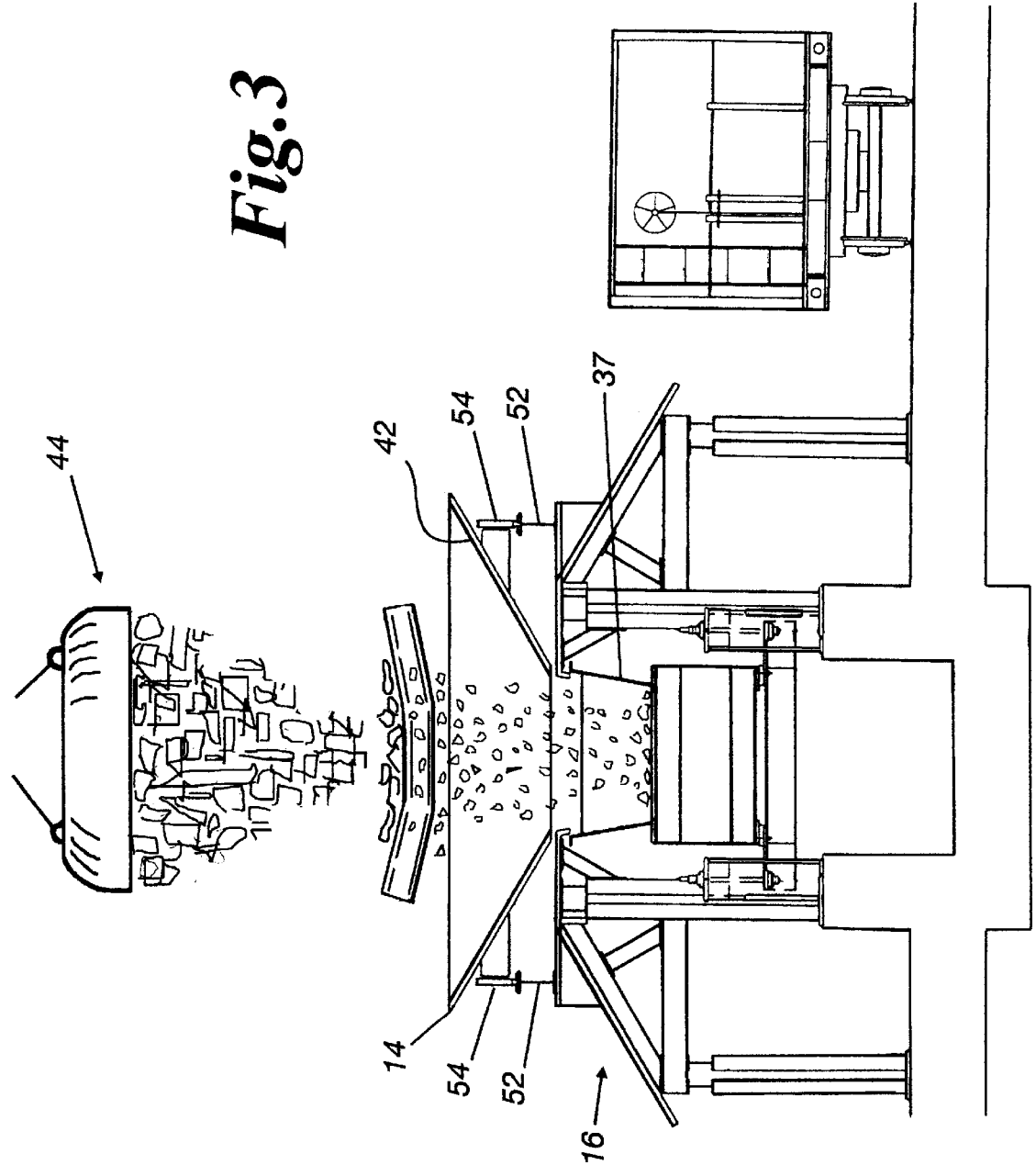

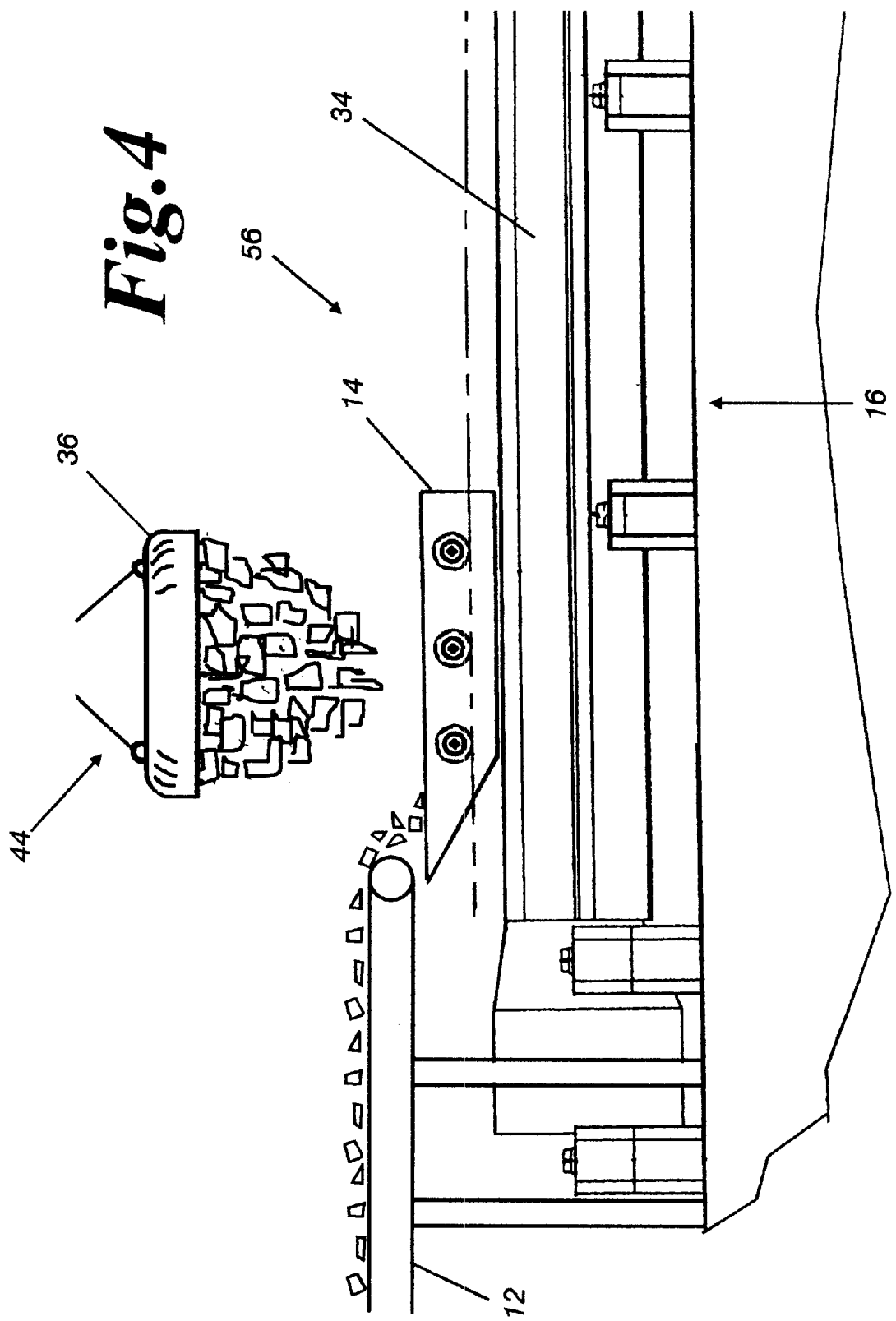

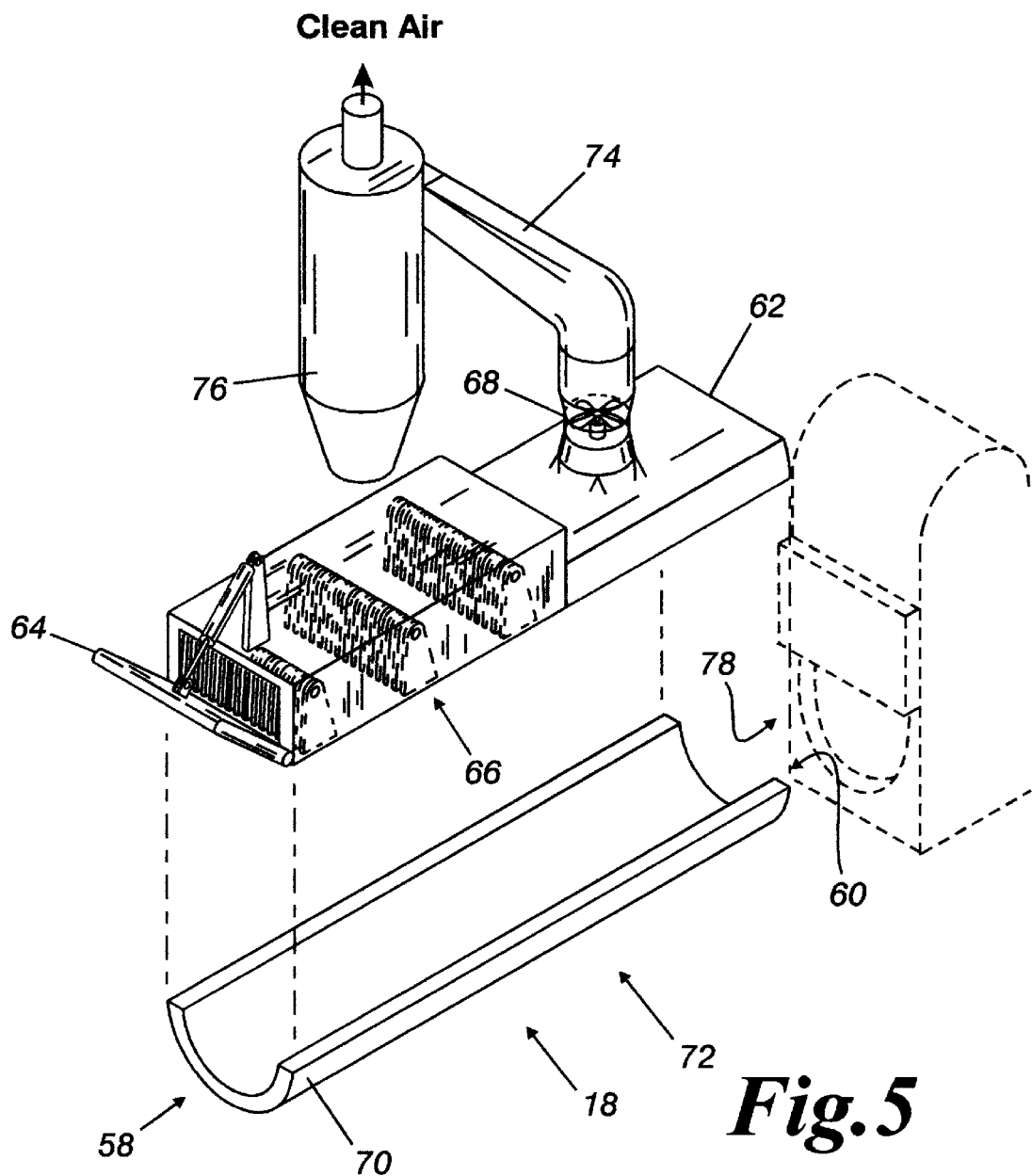

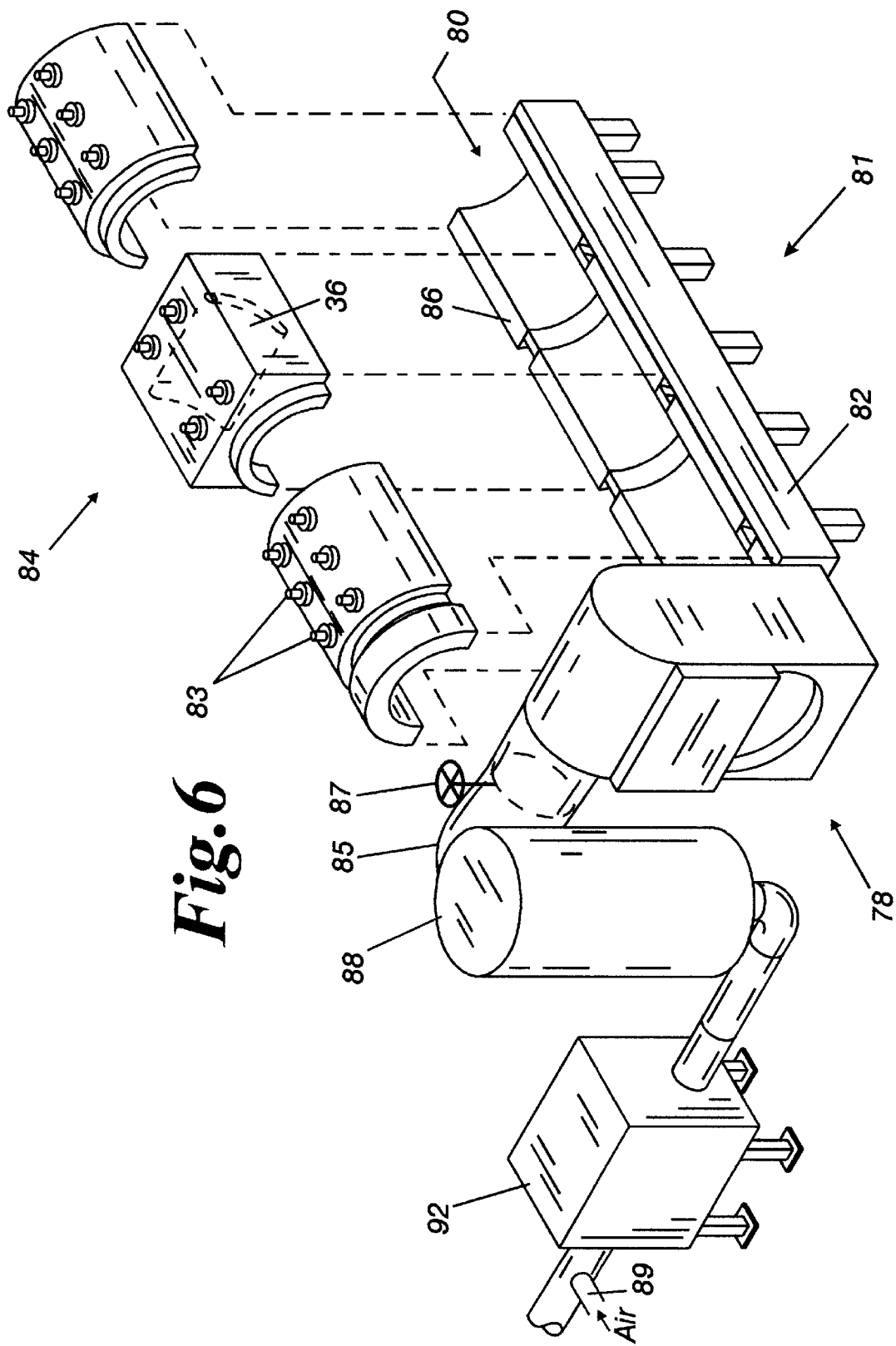

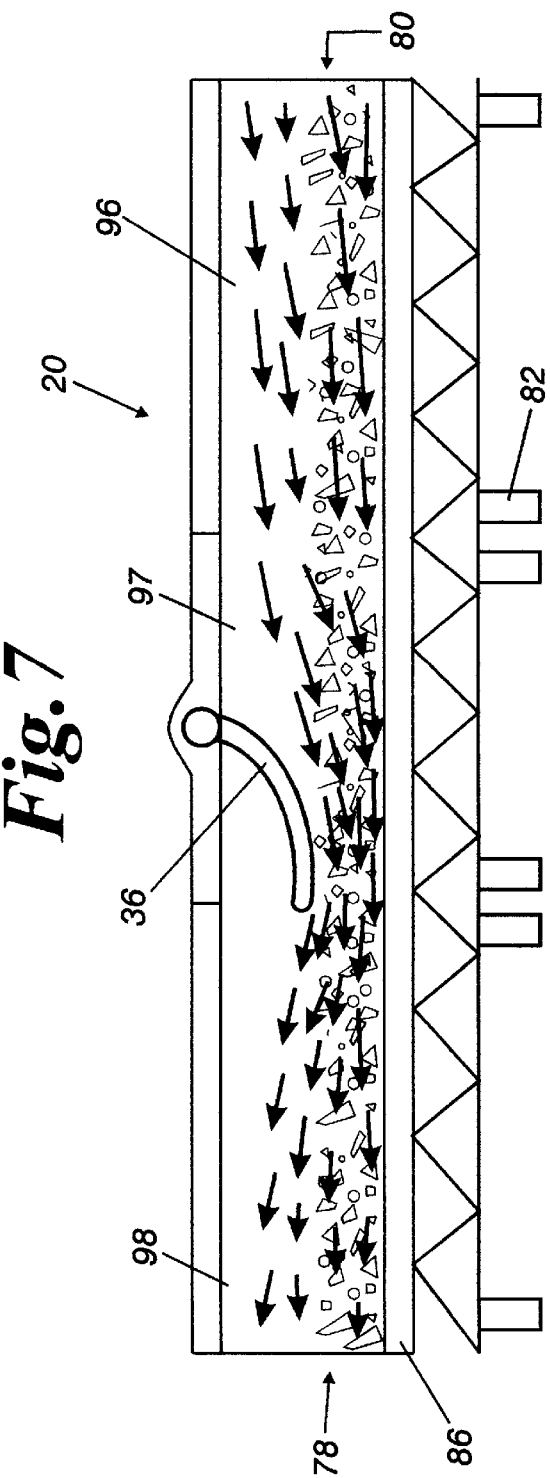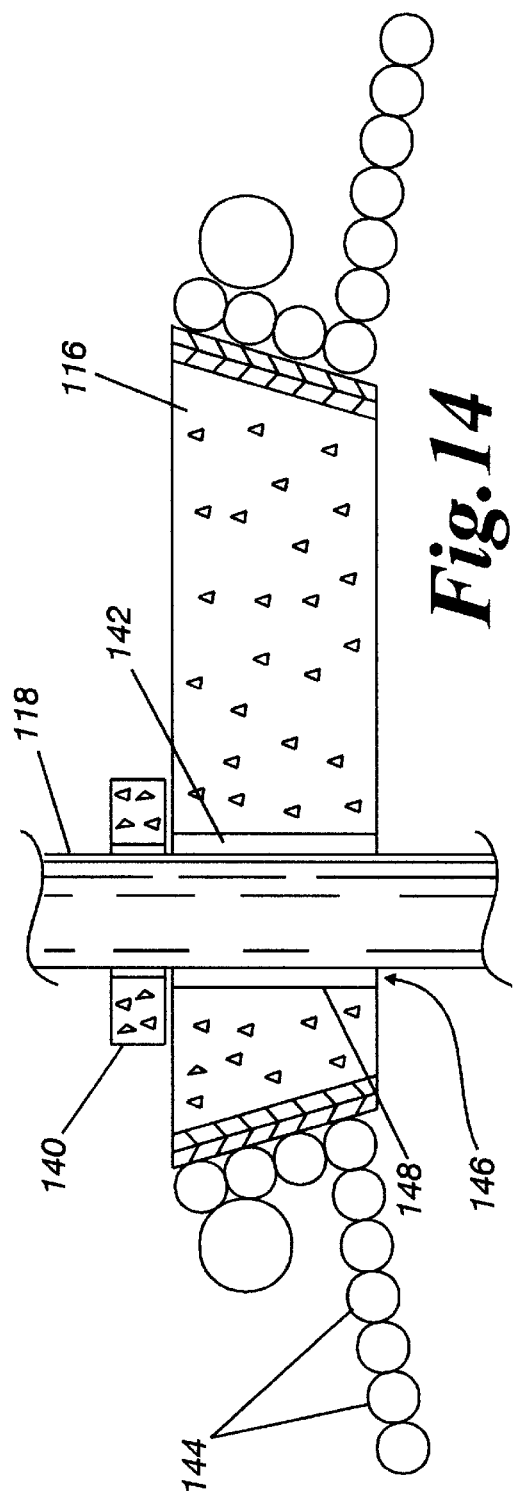

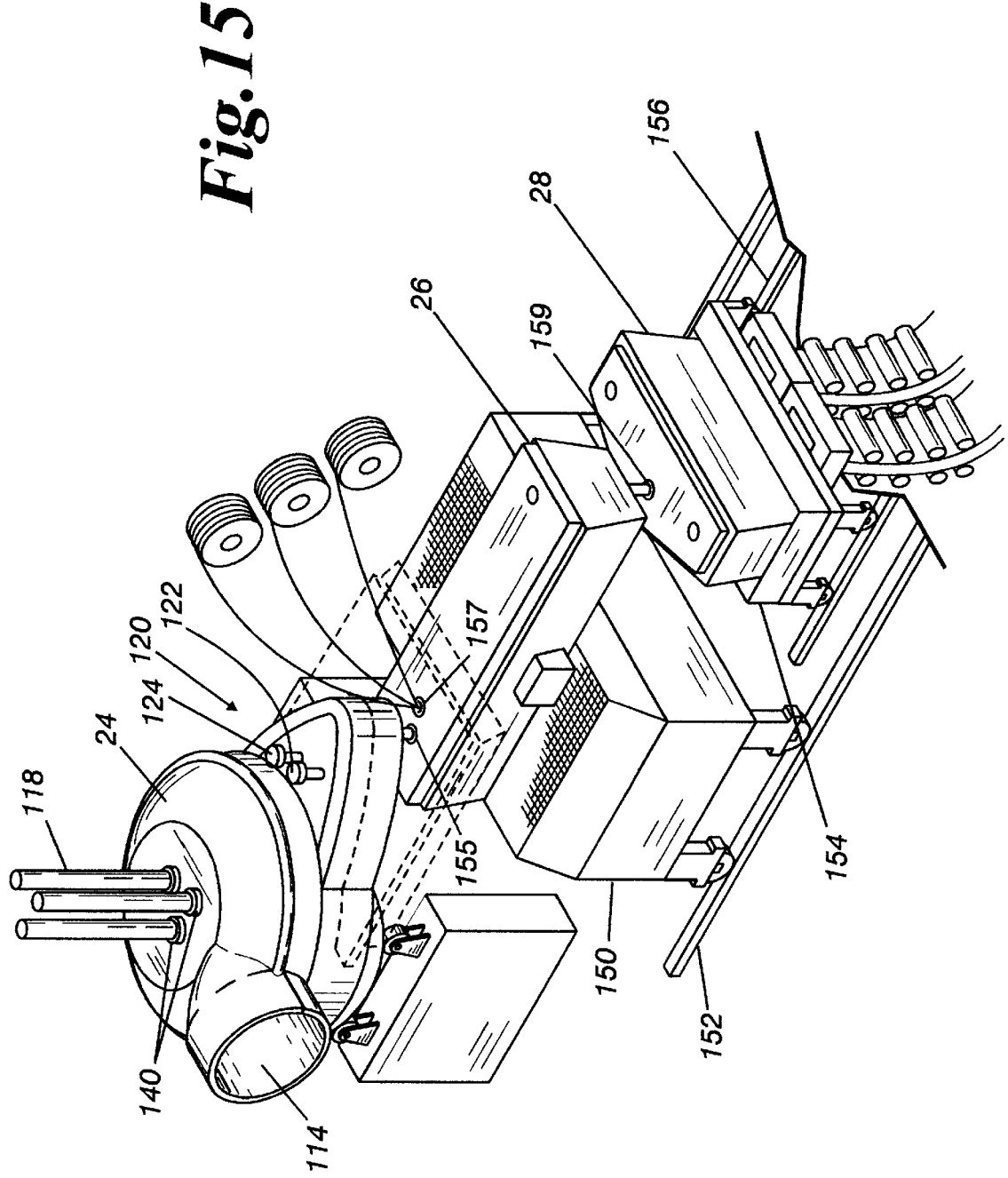

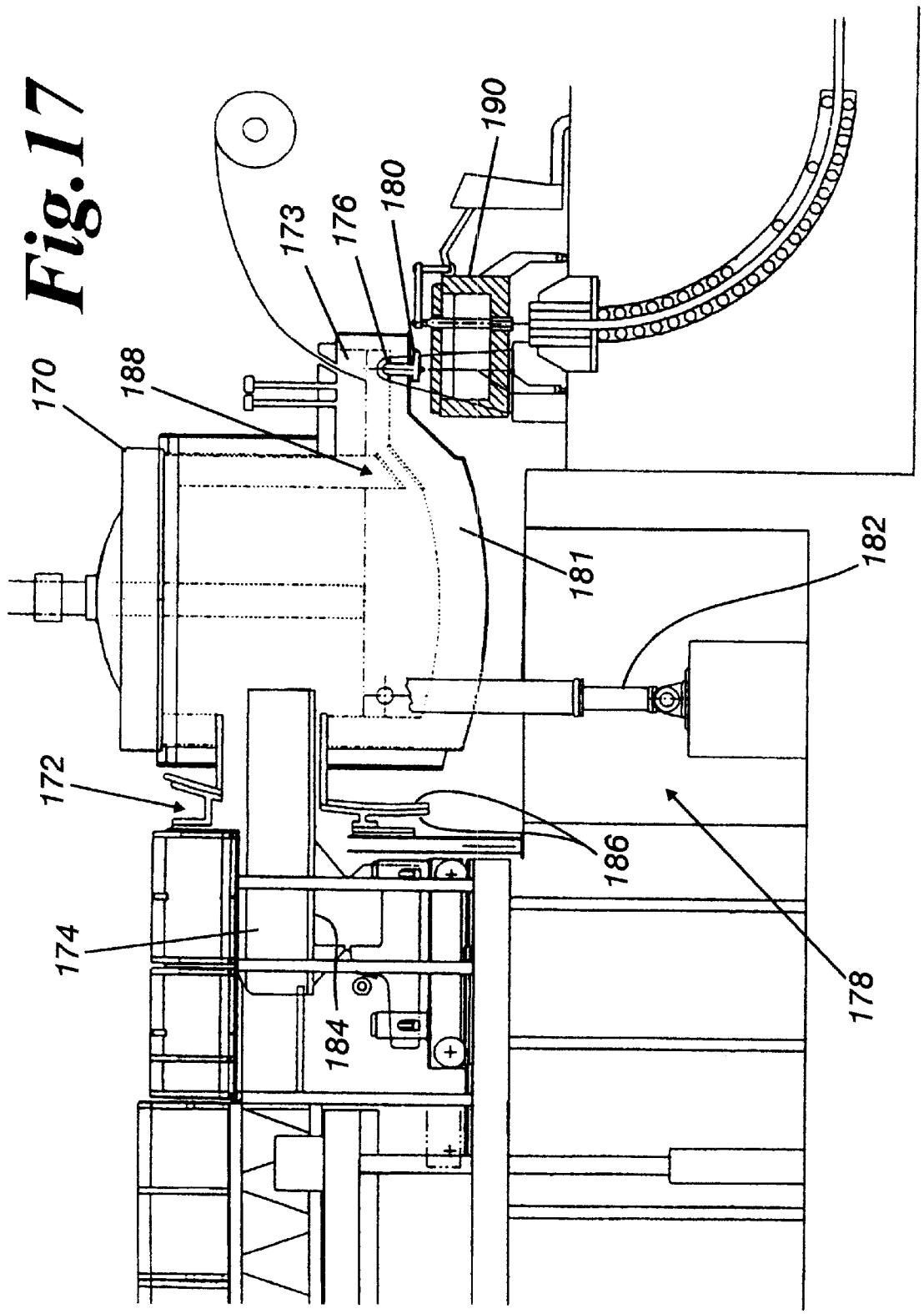

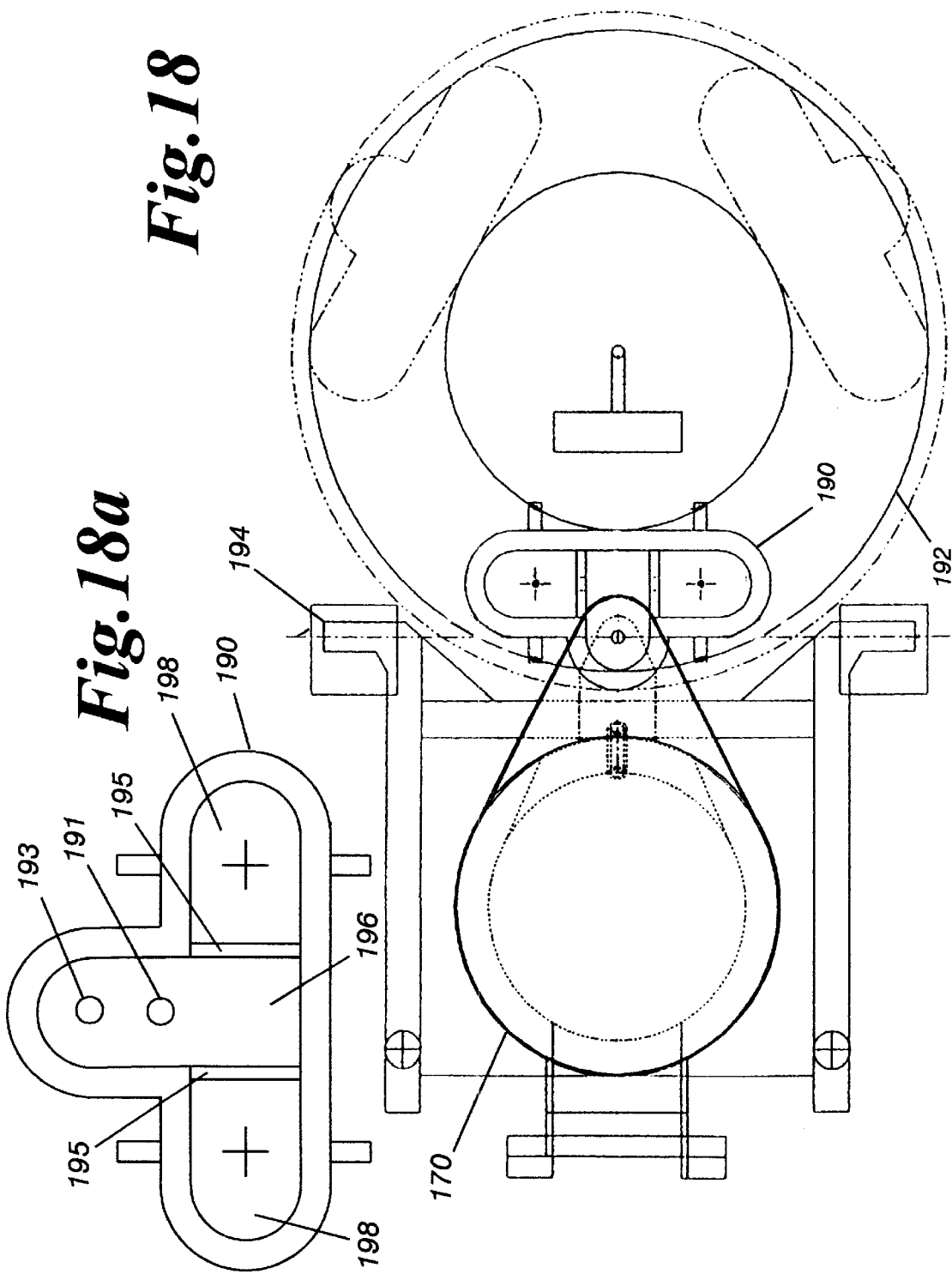

CONTINUOUS ELECTRIC STEELMAKING WITH CHARGE PREHEATING, MELTING, REFINING AND CASTING

CROSS REFERENCE TO RELATED APPLICATION

This application claims the benefit of U.S. Provisional Application No. 60/121,261 filed on Feb. 23, 1999.

FIELD OF THE INVENTION

The present invention relates to the production of steel from raw materials, and particularly to a method and apparatus for continuous electric arc furnace steelmaking and continuous casting having minimal emissions and electrical energy demand while maximizing steel production, including continuous casting. The invention is ideally suited for providing energy conservation and environmental protection while maximizing steel production.

BACKGROUND OF THE INVENTION

The production of steel and steel products, or products that incorporate steel therein, are essential to the maintenance and growth of many economies in various parts of the world. The acquisition and installation of steel refining facilities depend on a number of important considerations including environmental impact and cost efficiency. The manufacture of steel using an electric arc furnace (EAF) is a highly advantageous process in the modem steel industry because of the flexibility of the EAF in using mixes of different charge materials including liquid hot metals and the ability to produce substantially all known grades of steel.

One approach to refining steel is the use of continuous EAF charging, melting and refining systems having side feeding of the EAF, such as described in U.S. Pat. No. 4,543,124 ('124) and U.S. Pat. No. 5,800,591 ('591). The systems described in the '124 patent and the '591 patent provide continuity to the preheating of charge materials, the melting of charge materials, and the refinement of steel. Such continuous preheating, melting and refining systems incorporate furnaces having furnace heights that accommodate side feeding and off gas extraction at low gas flow velocities required to maintain suspension of dust in air. In these systems, a charging pan is located about a material entry opening in the side of the furnace. Charge material is introduced from the pan into the furnace, and CO rich off gas is transferred to the charge preheater to be used as a fuel for preheating purposes. The systems described in the '124 patent and the '591 patent are energy conservative.

Slag has been observed to accumulate beneath the pan in such systems and require removal by ramming. This causes periodic interruptions to the continuity of the refining process. What is needed is an improved method and apparatus for preheating, melting, and refining steel that extends the continuity of the overall steel production system to continuous casting by eliminating the batch operation at the ladle metallurgy station. Further needed is a method and apparatus for preheating, melting, and refining steel that permits side feeding into a furnace without requiring an increase in the furnace height and that improves the consistency of charge feeding.

Continuous steel preheating, melting and refining systems that have side feeding use equipment that interface with the furnace, such as a connecting car, is described in U.S. Pat. No. 4,681,537 and U.S. Pat. No. 4,836,732. Such equipment are prone to damage by heat and abrasion and require periodic maintenance. For example, the connecting car pan is exposed to the splash of molten steel and slag and to high temperature peaks of off gas. Consequently, the refining process may be interrupted by downtime required for the repair and maintenance of the connecting car. What is needed is a method and apparatus for preheating, melting and refining steel that facilitates the repair and maintenance of charge feeding interchangeable equipment that interface with the furnace As previously mentioned, environmental impact and cost efficiency are important considerations prior to acquiring and installing a steel refining system as well as during actual operation. Communities and government request that industry, in general, lessen their impact on the environment. What is needed is an improved method and apparatus for preheating, melting, and refining steel that provides emission abatement without further energy consumption. In particular, what is needed is method and apparatus for preheating, melting, and refining steel, having significant reductions in electrical energy requirement, electrode consumption, manpower, impact on the environment both inside and outside of the steel plant and baghouse dust disposal.

SUMMARY OF THE INVENTION

The present invention is an improved method and apparatus for continuous electric steelmaking with continuous casting added in cascade. The invention permits side feeding into a furnace without requiring an increase in the furnace height. The present invention also makes possible the repair and maintenance of interchangeable charge feeding equipment that interfaces with the furnace without interrupting continuity. When refining and casting steel, the present invention provides emission abatement without further energy consumption. In particular, the present invention provides significant reductions in electrical energy requirement, electrode consumption, manpower, impact on the environment both inside and outside of the steel plant, and baghouse dust disposal.

The invented apparatus for continuous preheating, melting, refining and casting of steel comprises a variable length secondary belt conveyor that is positioned in a charging area for introducing minute charge materials or slag formers, a skirted self-positioning charging cart coupled to the secondary conveyor, a charge conveyor that receives charge material having means for maintaining a homogeneous scrap bed height that is coupled to the self-positioning cart, a dynamic gas seal coupled to both the charge conveyor and a preheater, the preheater communicating with the charge conveyor for preheating the charge materials on the charge conveyor, a connecting car means for feeding charge materials into a furnace bath that is removably coupled to the preheater and charge conveyor, an electric arc furnace for melting and refining metallic charge therein, at least one electrode sealing ring that is coupled to the electrodes of the furnace, a directly fed intermediate metallurgical vessel that receives the molten metal discharged from the furnace, and a continuous casting device that receives refined alloyed steel from the intermediate metallurgical vessel. No ladle is used in this system so that the furnace pours directly into the intermediate metallurgical vessel thereby eliminating the requirements for both a ladle and ladle handling equipment.

The connecting means comprises a quickly interchangeable connecting car having a substantially round charging pan. The furnace comprises a shell that may be either a single or a split shell structure, a furnace roof having vertical openings for receiving electrodes and a charging opening that extends from an upper shell portion to a portion of the furnace roof to result in a split entry. The single shell or split shell are interchangeably used in the invented apparatus. The split entry opening receives the charging pan thereby reducing the furnace height and minimizing accumulation of slag beneath the pan during the melting-refining process. An electrode sealing ring is positioned over each electrode opening in the furnace roof to minimize air intake through the electrode openings to the interior of the furnace. The furnace may optionally include a tapping canopy that is positioned over a tapping portion of the furnace and includes a collector apparatus that is coupled to the baghouse for dust disposal. The tapping canopy collects process dust when the furnace is tapped.

The connecting car is removable and repositionable by an overhead crane. Prior to removing the connecting car, the furnace roof is lifted and pivoted clear of the charging pan and the charging pan is withdrawn from the preheater. The connecting car is then lifted away from the furnace and preheater by the crane and replaced by a stand-by connecting car. The removable connecting car and split entry furnace opening facilitate and simplify the repair and maintenance of the connecting car without interrupting the continuity of the furnace melting campaign.

The intermediate metallurgical vessel and the continuous caster extend the continuity of the overall steel production system to include continuous secondary refining, deoxidizing and alloying of liquid steel and continuous casting. The intermediate metallurgical vessel allows for a continuous tapping of liquid steel from the EAF that has a desired temperature and carbon, sulfur and phosphorous content. The continuous caster receives the refined-alloyed steel and continuously casts intermediate products that are immediately hot rolled in the rolling mill that is down stream of the caster.

The invented method and apparatus improves every aspect of conventional steel refining systems and extends the absolute continuity of the steel melting-refining operation not only to the refining of molten steel but to the production of a semi-finished product from the caster. Further, the present invention extends the continuity of the steel production process to the rolling mill so that a hot billet may be rolled immediately from the caster. For example, the invented method and apparatus do not require a casting crane and ladle, which are required by conventional steel refining systems, and provide rolling of the hot semi-finished product into a hot rolled long product or coil. The invented method and apparatus encompasses the introduction of preheated charge material, the melting and refining of steel and the production of hot rolled semi-finished product.

OBJECTS OF THE INVENTION

A principal object of the present invention is to provide an improved apparatus for preheating, melting, refining, casting and rolling steel that conserves energy and protects the environment.

Another object of the invention is to provide a method and apparatus for electric steel production that extends the continuity of the steel production operation to include charging, preheating of charge materials, refining of steel, ladle metallurgy, casting and hot rolling semiproduct and ensures the absolute continuity of the liquid steel to a continuous casting device.

Another object of the invention is to provide a method and apparatus for electric steel production that abates emission without further energy consumption.

Another, more particular object of the invention is to provide a method and apparatus for electric steel production that has significant reductions in electrical energy requirement, electrode consumption, manpower and process dust disposal.

Another, more particular object of the invention is to provide a method and apparatus for electric steel production that maintains the homogeneity of charge material introduced into the furnace.

BRIEF DESCRIPTION OF THE DRAWINGS

The foregoing and other objects will become more readily apparent by referring to the following detailed description and the appended drawings in which:

FIG. 2 is a perspective view of the secondary conveyor, self-positioning charging cart, and charge conveyor shown in FIG. 1;

FIG. 2a is a side view of the de-duster and a portion of the charge conveyor in accordance with an embodiment of the present invention;

FIG. 3 is a cross-sectional view of the charge conveyor and the self-positioning charging cart shown in FIG. 1;

FIG. 4 is a side view of the charge conveyor and self-positioning charging cart shown in FIG. 2;

FIG. 5 is a perspective view of the dynamic gas seal shown in FIG. 1, showing a portion of the preheater in dotted lines;

FIG. 6 is a perspective view of the preheater with the hot gas deflector in the central section in accordance with the present invention, showing some of the off-gas handling devices;

FIG. 7 is a sectional view of a portion of the charge preheater in accordance with the present invention, showing the flow of off gas through the preheater;

FIG. 14 is a sectional view of the furnace roof with electrode sealing floating rings in accordance with the present invention;

FIG. 15 is a perspective view of the furnace, electrode sealing floating rings, intermediate metallurgical vessel, and continuous casting device in accordance with the present invention, showing the tapping canopy in dotted lines;

FIG. 17 is a cross-sectional view of an alternative embodiment of the present invention, showing the furnace, the connecting car pan protruding into the furnace, the furnace discharge chamber, the furnace discharge mechanism, the bath exit orifice from the furnace to the discharge chamber, and the continuous casting device;

FIG. 18 is a top schematic view of the furnace of FIG. 17, showing the tundish, the three-position continuous casting device support and the furnace trunnions; and FIG. 18a is a top view of the tundish of FIG. 17.

DETAILED DESCRIPTION

The present invention is an improved method and apparatus for continuous electric steel making with continuous casting added in cascade. The present invention extends the continuity of a steel preheating, melting, and refining operation to lengthen the duration of a campaign. In particular, the present invention accomplishes the objects of charge preheating, melting, refining, steel metallurgy and casting in a single closed system and is continuous from one portion of the system to the next portion. The steel metallurgy, for example, deoxidizing and alloying, is conducted without a ladle or associated ladle equipment, and hot intermediate product may be immediately rolled from the invented apparatus.

Figure 1:
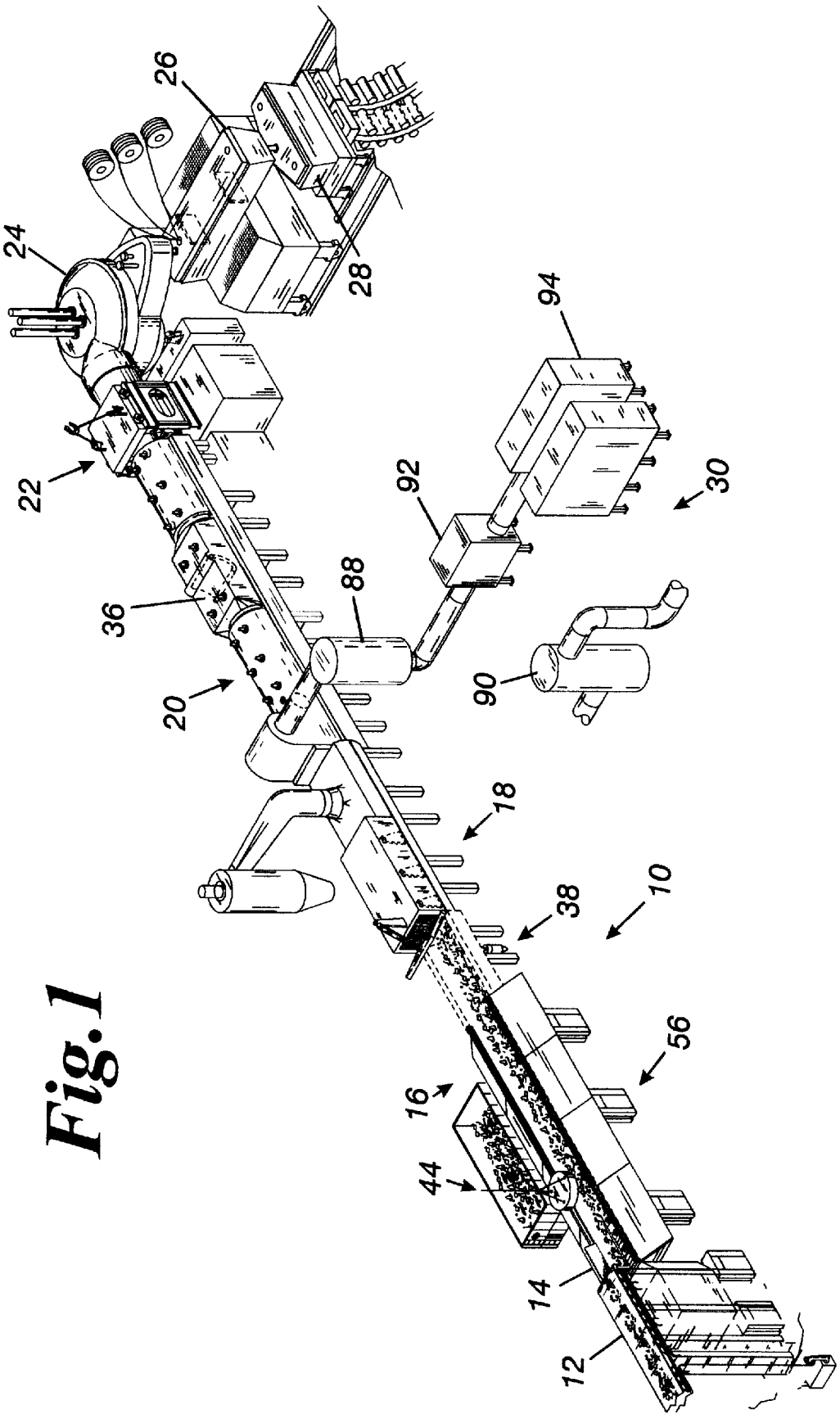
FIG. 1 is an isometric view of an apparatus for steelmaking in accordance with the present invention, showing the secondary conveyor, self-positioning charging cart, charge conveyor, dynamic gas seal, preheater, connecting car, EAF, intermediate metallurgical vessel, and continuous casting device.

Referring now to the figures, and in particular to FIG. 1, an improved apparatus for continuous electric steel making, shown generally at 10, comprises a variable length secondary conveyor 12 for introducing minute charge materials and slag formers, a skirted self-positioning charging cart 14 engaging the secondary conveyor 12, a charge conveyor, shown generally at 16, having means for maintaining a homogeneous scrap bed height that is coupled to the charging cart 14 and that receives charge material, a dynamic gas seal, shown generally at 18, that is coupled to both the charge conveyor 16 and a preheater, shown generally at 20, the preheater 20 preheats the charge materials on the charge conveyor 16 and includes at least one pivoting hot gas deflector 36 (FIG. 7) shown in dotted lines, a connecting car, shown generally at 22, for feeding charge materials into a furnace bath that is removably coupled to both the preheater 20 and charge conveyor 16, an electric arc furnace (EAF) 24 for melting and refining metallic charge therein, a directly fed intermediate metallurgical vessel 26 that is alignable with the molten metal discharge from the furnace 24, and a continuous casting device 28 for continuously casting. The invented apparatus 10 may additionally include a hot off gas treating system, shown generally at 30, to comply with local regulation of unwanted emissions. Hot product may be rolled directly from the intermediate product emerging from the continuous casting device 28.

FIG. 2 is a perspective view of the secondary conveyor 12, self-positioning charging cart 14, and charge conveyor 16 shown in FIG. 1. The secondary conveyor 12 is positioned at the end of the charge conveyor 16 and coupled to one end of the charging cart 14. The charging cart 14 is moveable along the length of the charge conveyor 16, and the length of the secondary conveyor 12 is varied in accordance with the position of the charging cart 14. For example, when the charging cart 14 is positioned closer to the dynamic gas seal 18, the length of the secondary conveyor 12 is extended from the end of the charge conveyor 16 to the position of the charging cart 14.

Smaller charge materials from about 1 mm to about 100 mm in size are transported by the secondary conveyor 12 and deposited onto the charge conveyor 16. The skirt 42 of the charging cart 14 directs the charge materials transported by the secondary conveyor 12 and by the raw material handling equipment, shown generally at 44, onto the charge conveyor 16. The secondary conveyor 12 preferably comprises a moving flat belt 50 having means for varying the length of the secondary conveyor 12 while maintaining the tension of the flat belt 50. In one embodiment of the present invention, a surplus portion, shown generally at 46, of the conveyor belt 50 is coupled to a biasing means 48, such as a weight, to keep the conveyor belt 50 taut while allowing the secondary conveyor 12 to be extended or retracted depending on the position of the charging cart 14. The surplus portion 46 of the conveyor belt 50 allows the length of the secondary conveyor 12 to extend as the charging cart 14 is displaced towards the furnace 24. The biasing means 48 gathers the surplus portion 46 of the conveyor belt 50 as the charging cart 14 is displaced away from the furnace 24. Other conventional means for varying the length of the secondary conveyor 12 may be used, including but not limited to a take-up reel.

Additionally, the charge conveyor 16 may have a de-duster, shown generally at 38, that is attached to the charge conveyor 16 for collecting particles, such as dirt, from the charge material on the charge conveyor 16. FIG. 2a is a side view of the de-duster 38 and a portion of the charge conveyor 16 in accordance with an embodiment of the present invention. The de-duster 38 is capable of separating dust, or dirt, from metallics that may have been collected by the de-duster 38. The de-duster 38 is preferably coupled to an overlapping section of conveyor pans, shown generally at 40, of the charge conveyor 16 in order to collect particles from the charge material as the charge material advances towards the furnace 24. Metallics that are collected by the de-duster 38 may be recycled. The de-duster 38 reduces the amount of slag to be melted by reducing the amount of dirt that is introduced to the furnace 24 with the charge material. This reduces the amount of gaseous emissions that may result from the slag produced from melting charge material with the accompanying dirt.

FIG. 3 is a cross-sectional view of the charge conveyor 16 and the self-positioning charging cart 14 shown in FIG. 1. The charging cart 14 is coupled to a guide means, such as a pair of rails 52 mounted atop the charge conveyor 16, that engages a set of rail wheels 54 mounted on the cart 14, and is thereby moveable along the entire length of the charge conveyor 16. The charging cart 14 self-positions along the length of the charge conveyor 16 to be in close proximity with the end of the scrap bed. A charging cart controller (not shown) having a scrap detecting device may be used to locate the end of the scrap bed and position the charging cart 14 adjacent the same. Positioning the charging cart 14 adjacent the end of the scrap bed facilitates a desired construction of the scrap bed and allows the charge material to be homogeneously introduced into the furnace 24. For example, when the charging cart 14 is positioned adjacent the end of the scrap bed, the charging cart directs the loading of charge material onto the charge conveyor 16 so that the scrap bed on the charge conveyor 16 is maintained at a consistent height or depth.

FIG. 4 is a side view of the charge conveyor 16 and self-positioning charging cart 14 shown in FIG. 2. The charge conveyor 16 comprises a charging skirt 34 that is located at a charging section, shown generally at 56, of the charge conveyor 16 and a conveyor pan 37 (FIG. 3) having sidewalls of a predetermined height. The charge conveyor 16 receives charge material of variable dimensions, and preferably receives charge material having at most a length of about 1.5 meters. The dimensions of the charge material may however vary depending on the project size. The skirt 34 of the charge conveyor 16 extends from the secondary charge conveyor 12 to a point before the dynamic gas seal 18. The charge conveyor 16 extends from the charging section 56 through the preheater 20. The charge conveyor 16 may comprise a single unit having an associated drive mechanism or a plurality of connected units that each have an associated drive mechanism.

When loading charge material onto the charge conveyor 16, the raw material handling equipment 44 is preferably positioned overhead the charging cart 14 in order that skirt 42 of the charging cart 14 may direct the scrap material onto the conveyor bed. At times, the scrap bed in the charging section 56 may exceed a desired scrap bed height. The height of the skirt 34 of the charge conveyor 16 allows the raw material handling equipment 44, such as a mobile crane with a magnet 36, to easily access charge material in the charging section of the charge conveyor 16. In particular, the skirt wall height of the charging skirt 34 is preferably about the height of the conveyor pan 37 sidewalls. Thus, the skirt 34 of the charge conveyor 16 allows for simple removal of charge materials that exceed the desired scrap bed height, and thereby assists in maintaining the homogeneity of the scrap bed and the continuity of the overall steel production process.

The secondary conveyor 12, the charging cart 14 and the charge conveyor 16 together allow smaller charge materials and additives to be added to the charge conveyor 16 underneath or on top of the large charge materials that are loaded onto the charge conveyor 16 by the raw material handling equipment 44. This aids in maintaining the density of charge which is particularly useful for controlling the overall melting-refining process.

FIG. 5 is an exploded view of the dynamic gas seal 18 shown in FIG. 1. The dynamic gas seal 18 is coupled to a dynamic seal portion, shown generally at 72, of the charge conveyor 16 and has an entrance, shown generally at 58, and an exit, shown generally at 60, to allow charge materials transported by the charge conveyor 16 to move therethrough. The dynamic seal 18 comprises a cover 62, a push-down plate 64 that is positioned at the entrance 58 of the dynamic seal 18, a plurality of mechanical curtains, shown generally at 66, that are positioned adjacent the dynamic seal entrance 58 and the push-down plate 64, and a variable speed blower 68 that is positioned between the curtains 66 and the dynamic seal exit 60. The dynamic gas seal 18 provides a sealing chamber adjacent a charge material entry end, shown generally at 78, of the preheater 20. The dynamic gas seal 18 preferably limits air intake to the preheater 20 during the continuous preheating of charge materials.

The seal cover 62 substantially encloses the dynamic seal portion 72 of the charge conveyor 16 to maintain a negative pressure therein. The conveyor pan 70 in the dynamic seal portion 72 of the charge conveyor 16 is preferably semi-round. The push-down plate 64 directs obtruding scrap material down against the scrap bed of the charge conveyor 16 as the charge material is advanced towards the furnace 24. The push-down plate 64 may be actuated by a switch which is controlled either by a human operator or by a height monitor. For example, a video camera can monitor the height of scrap as the scrap approaches the dynamic seal 18, and whenever a piece of scrap protrudes above the height of the seal entry 58, the push-down plate 64 is activated so that the plate 64 pivots downwardly, pushing the compressible scrap into the charge material so that the charge material enters the dynamic seal 18.

The variable speed blower 68 is responsive to differential pressure measurements of the sealing chamber and controls the amount of air entering through the dynamic seal 18. The combination of the curtains 66 and the variable speed blower 68 assist in creating a required negative pressure within the dynamic seal 18. The curtains 66 provide obstruction to the exchange of air from outside of the dynamic seal 18 to the interior of the dynamic seal. In particular, the curtains 66 and variable speed blower 68 facilitate the control of the required negative pressure in the dynamic seal 18 to minimize air intake therein, shortens the time and power that is needed to reach the required negative pressure, and shortens the response time of the invented apparatus 10 to changes of the negative pressure in the preheater 20.

A cyclone 76 may optionally be attached to the variable speed blower 68 via a conduit 74 to remove dust from the air that may have been drawn into the dynamic seal 18 by the variable speed blower 68. Any significant amount of dust separates from the air due to the centrifugal force encountered by the air in the cyclone 76 and is collected at the bottom of the cyclone 76. The bottom of the cyclone 76 discharges the aforementioned dust, and the top of the cyclone 76 releases air that has been cleaned by the cyclone 76. The cyclone reduces the emission of dust by the invented apparatus 10.

FIG. 6 is a perspective view of the preheater 20 with the hot gas deflector 36, shown in dotted lines, in accordance with the present invention. The preheater 20 includes the aforementioned material entrance 78 and a material exit, shown generally at 80, to allow charge materials transported by the charge conveyor 16 to move therethrough. The preheater 20 comprises a support 82, a cover, shown generally at 84, that is preferably refractory lined and attached to the support to form a preheating chamber, a semi-round water cooled conveyor pan 86 contained within the preheating chamber, and at least one hot gas deflector 36 coupled to the preheater cover 84.

The preheater cover 84 substantially encloses a preheater portion 81 of the charge conveyor 16 and may be severable into three or more sections for detachment from the charge conveyor 16. The preheater cover 84 is provided with injectors 83 for introducing combustion air into the preheating chamber. The number and arrangement of injectors 83 for each section of the preheater cover 84 may be varied depending on the desired combustion air distribution throughout the preheating chamber. The hot gas deflector 36 is moveably attached to the preheater cover 84 and may be raised or lowered in order to direct hot off gas from the furnace 24 down and into the charge material on the conveyor bed. The deflector 36 is substantially rectangular and slightly curved from the top to the bottom. Although the deflector 36 is described in the context of a rectangular and curved configuration, the deflector 36 is not intended to be limited to such configuration and may be configured in various shapes with various surface contours.

A dust removal system 30 is attached adjacent the entrance 78 to the preheater 20 by a conduit 85. In one embodiment of the invention, the dust removal system 30 comprises a refractory lined post combustion chamber 88, and a boiler 92 that is connected to a baghouse 94 (FIG. 1). This embodiment is particularly suited for energy efficient dust removal. In an alternative embodiment, as best shown in FIG. 1, a quencher 90 replaces the boiler 92 and interconnects the post combustion chamber 88 and the bag house 94. The dust removal system 30 removes dust from the off gas. A damper 87 is positioned in the conduit 85 to restrict or constrict the flow of gas therethrough and thereby regulate the flow of gas to the dust removal system 30. The degree of gas flow constriction assists in maintaining desired pressures in the preheater 20 and the dynamic seal 18. The post combustion chamber 88 removes or minimizes unwanted emissions. The boiler 92 recycles the heat energy contained in the off gas passing therethrough to heat water or generate steam for use in further energy generation. The quencher 90 allows off gas to cool within a desired time frame in order to minimize formation or reformation of unwanted emissions by introducing water spray or mist into the air passing through the quencher 90. To further cool the temperature of the gases entering the baghouse 94 (FIG. 1), lower temperature air may be injected into the dust disposal system 30 via an air injection duct 89 after the boiler 92 or after the quencher 90.

FIG. 7 is a sectional view of the preheater 20 in accordance with the present invention, showing the flow of off gas through the preheater 20, and particularly, through the charge material contained in the conveyor bed. In a first section 96 of the preheater 20, the section proximally located with respect to the furnace 24, combustion air is injected into the preheater 20 by the injectors 83 (FIG. 6) to obtain a partial combustion of CO to $CO_2$ while maintaining a reducing atmosphere in the first section 96. In a second section 97, the section of the preheater 20 that is adjacent the first section 96, a pre-determined amount of combustion air introduced by the injectors 83 (FIG. 6) burns most of the remaining CO into $CO_2$ In the second section, a portion of or the entire hot gas volume from the furnace 24 is directed into intimate contact with the charge material in the scrap bed by the hot gas deflector 36. This operation increases the efficiency of the heat transfer from the off gas to the charge materials and accelerates the thermal incineration of all combustible matter accompanying the charge materials. As previously mentioned, the hot gas deflector 36 may be pivoted towards and away from the scrap bed in order to control such heat transfer and thermal incineration.

In a third section 98, the section of the preheater 20 that is adjacent the material entry end 78 of the preheater 20, the combustion air is regulated to maintain about a 5% excess concentration of oxygen. In the third section 98, the atmosphere is completely oxidizing, and the temperature of the off gas remains high to complete the thermal incineration of undesirable emissions in the post combustion chamber 88. In a preferred embodiment, all sections of the preheater cover 84 are substantially semi-round with the exception of any section containing a hot gas deflector 36. Alternatively, the sections of the preheater cover 84 may have different contours. While the preheater 20 is described in the context of three sections, the preheater 20 is not intended to be limited to three sections and additional sections may be provided. Further, while the preheater 20 is described in the context of one hot gas deflector 36, the preheater 20 is not intended to be limited to one hot gas deflector and multiple deflectors may be provided.

Figure 8:
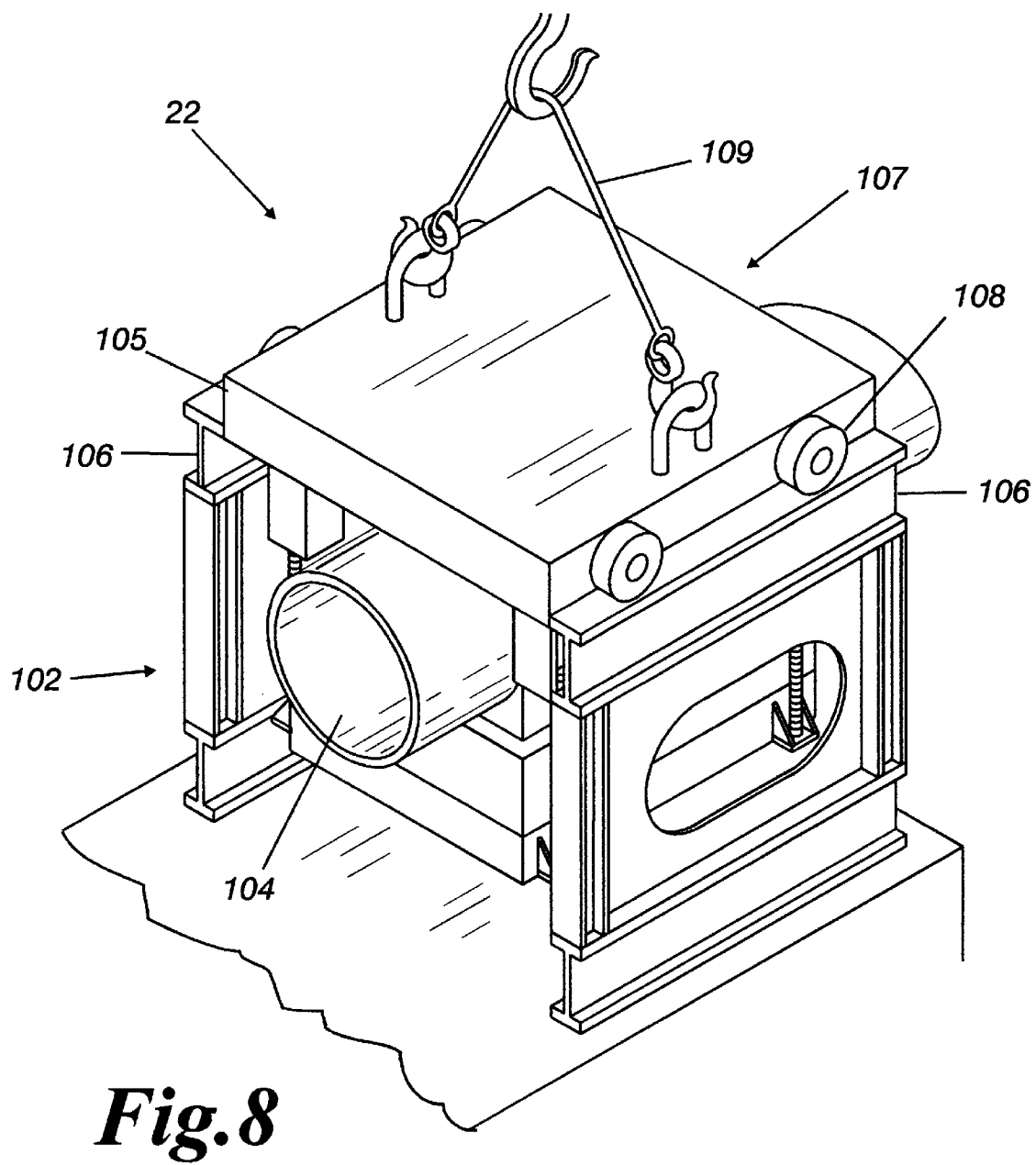
FIG. 8 is a perspective view of the connecting car in accordance with the present invention.
Figure 9:
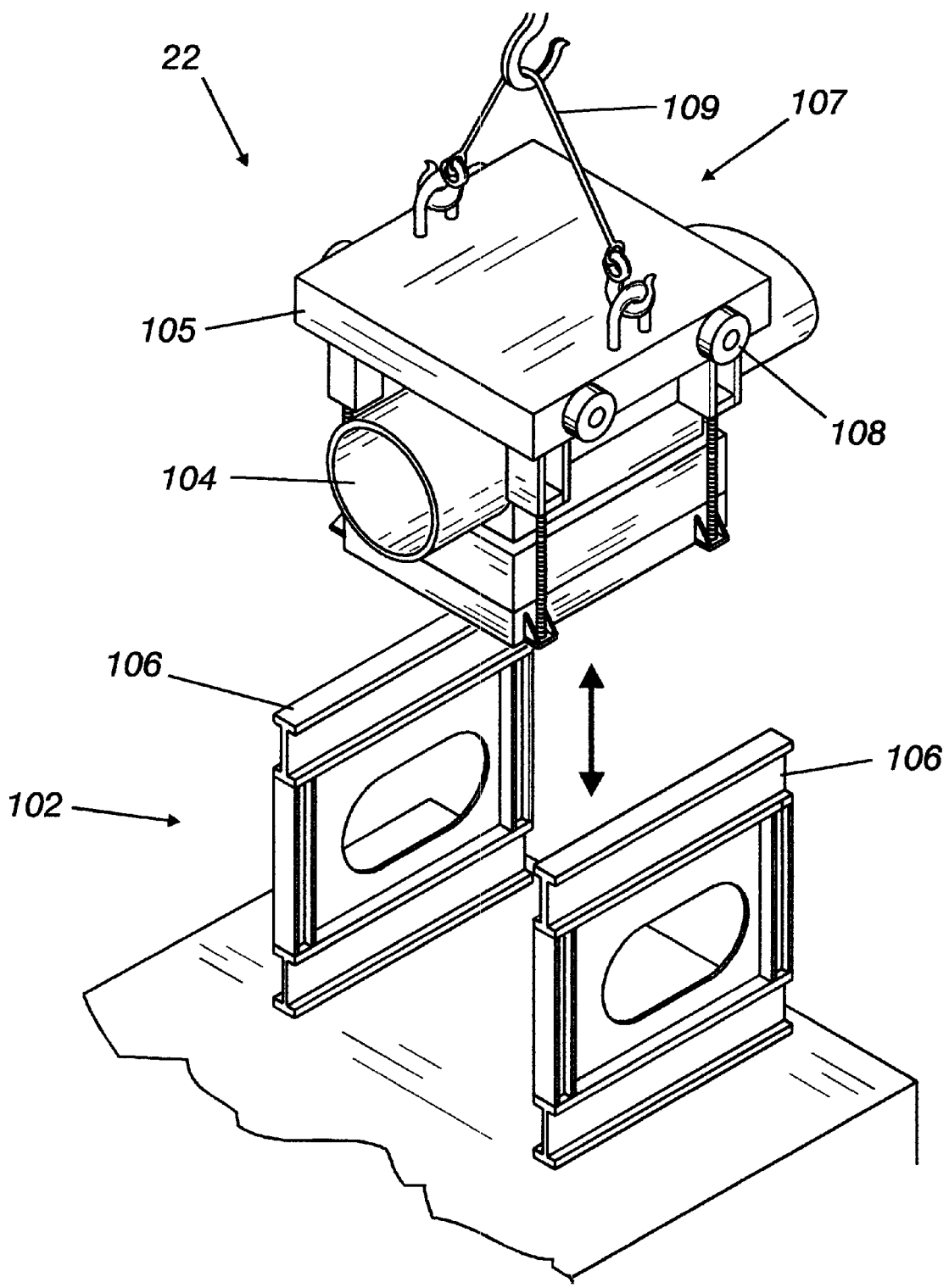
FIG. 9 is a perspective view of the connecting car of FIG. 9 during a replacement operation.

FIG. 8 is a perspective view of a connecting car 22 in accordance with the present invention. FIG. 9 is a perspective view of the connecting car 22 of FIG. 8 during a replacement operation. The quick, interchangeable connecting car 22 provides an interface between the preheater 20 and the furnace 24 for discharging preheated charge materials into the furnace 24. The connecting car 22 is positionable on an elevated platform, shown generally at 102, between the preheater 20 and the furnace 24. The connecting car 22 comprises a round charging pan 104, a lift access, shown generally at 107, that is attached to the top of the connecting car 22 and a displacing means for temporarily disengaging the connecting car from the preheater 20.

The charging pan 104 is preferably water cooled in order to withstand the high temperatures from the furnace 24. During operation, the charging pan 104 overlaps with the semi-round water cooled conveyor pan 86 of the preheater 20 in order to receive preheated charge material from the preheater 20. The lift access 107 allows a furnace crane (not shown) to temporarily couple to the top of the connecting car 22. In one embodiment, the lift access 107 includes an arresting cable 109 that is attached to the top of the connecting car 22. The elevated platform 102 has rails 106 mounted to the top of the platform 102 and rail wheels 108 that are mounted to the connecting car 22. When the connecting car 22 is positioned on the platform 102, the rail wheels 108 engage the rails 106 and thereby allows the connecting car 22 to be displaced towards or away from the furnace 24 and the preheater 20. While the connecting car 22 is described in the context of a having a rail-wheel mechanism, the connecting car 22 is not intended to be limited to the rail-wheel mechanism and may use any conventional horizontal displacing mechanism, including but not limited to a wheel and guide device and a rail and bearing device.

During steel production, the round charging pan 104 of the connecting car 22 is introduced into the furnace 24 through a round material entry opening 114 (FIGS. 10 and 15), described in further detail hereinbelow. The round charging pan 104 and the round material entry opening 114 allow the furnace 24 to be tapped without interruption of the steel production process. For example, the connecting car 22 is not required to be withdrawn from the furnace 24 if the furnace 24 is required to be tilted for tapping because the furnace 24 may be tilted about the central axis of the round charging pan 104. In a preferred embodiment, the diameter of the round charging pan 104 is of a sufficient size to evacuate the furnace off gas for a given project capacity while keeping the flow rate of off gas below 10 meters/ second. Because the material entry opening 112, the charging pan 104 and the combination of the conveyor pan 86 of the preheater 20 and the first section 96 of the preheater 20 are round, the heat from the furnace off gas is effectively transferred to the preheating chamber and the desired system pressures are maintainable and controllable.

As best shown in FIGS. 8 and 9, the connecting car 22 may be quickly removed from the elevated platform 102 in order to facilitate interchanging connecting cars. For example, the connecting car 22 is removable by a furnace crane that lifts and removes the connecting car from the platform 102. During the replacement operation, the furnace crane may temporarily couple to the lift access 107 of the connecting car 22 using any conventional hooking device. Prior to removing the connecting car 22, the furnace roof 112 (FIGS. 10 and 11), described in further detail hereinbelow, is lifted and pivoted clear of the connecting car charging pan 104, and the charging pan 104 is disengaged from the preheater 20. The connecting car 22 is then vertically withdrawn away from the furnace 24 and preheater 20 by the crane. The interchangeable connecting car 22 and split entry of the furnace 24 facilitate and simplify the repair and maintenance of the connecting car 22.

Figure 10:
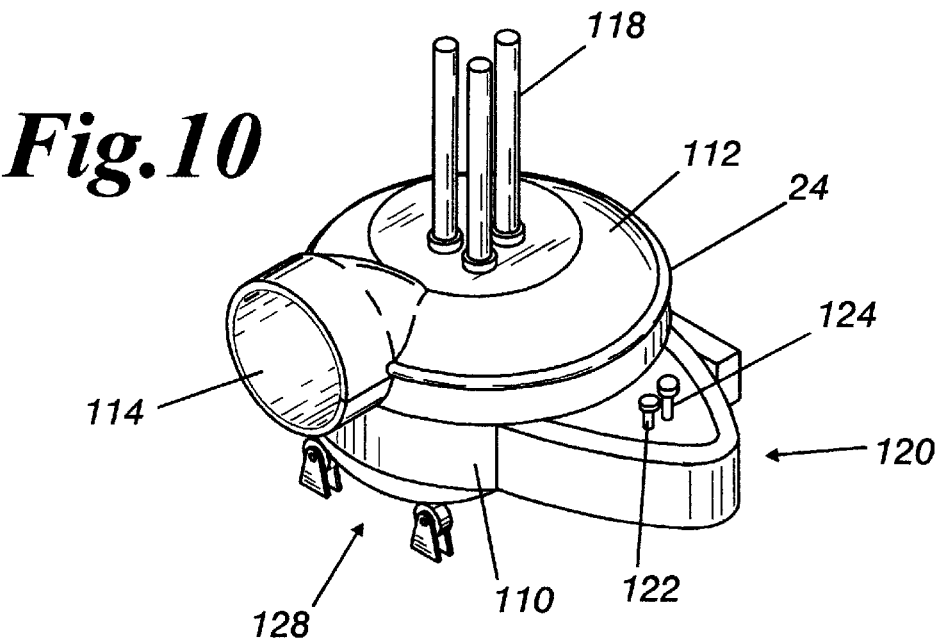
FIG. 10 is a perspective view of the electric arc furnace in accordance with the present invention showing the furnace cover in place.
Figure 11:
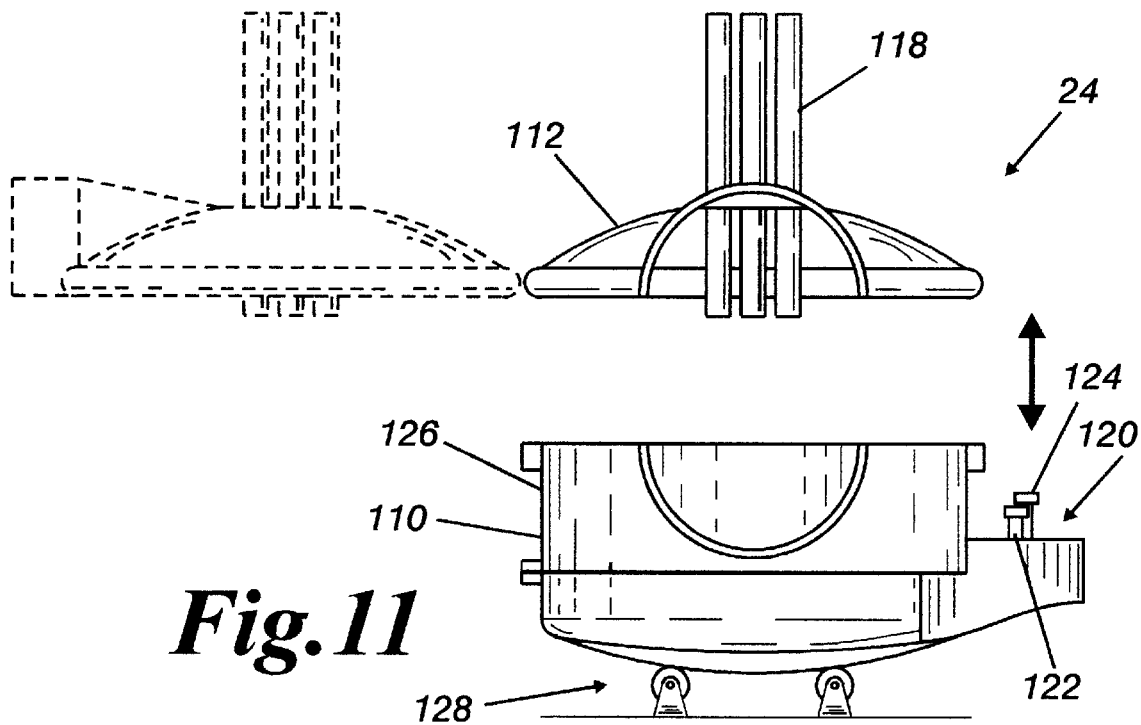
FIG. 11 is a side view of the furnace of FIG. 10 with the cover lifted, showing a right angled view of the cover in dotted lines.

FIG. 10 is a perspective view of the furnace 24 in accordance with the present invention showing the furnace cover in place. FIG. 11 is a side view of the furnace of FIG. 10 with the cover lifted, showing a right angled view of the cover in dotted lines. The furnace comprises a shell 110, the aforementioned furnace roof 112, and the aforementioned round charging opening 114. The upper portion of the shell 110 may be refractory lined or water-cooled. The furnace roof center 116 (FIG. 14) is refractory lined, and the furnace roof 112 has at least one opening 142 (FIG. 14) for receiving an electrode 118 therethrough, described in further detail hereinbelow. Additionally, the furnace 24 may further include, in a tapping portion, shown generally at 120, a thermocouple 122 and a steel analyzer sensor 124 in order to assist in the melting-refining process. The thermocouple 122 and the steel analyzer sensor 124 obtain measurements from the steel bath within the furnace 24. The furnace roof 112 is separable from the shell 110 and may be lifted and pivoted using a furnace crane. Portions of the furnace roof 112 may be selectively water cooled using a plurality of cooling tubes 144 (FIG. 14).

The charging opening 114 extends from an upper shell portion 126 to a portion of the furnace roof 112 thereby resulting in a split entry. The charging opening 114 is preferably aligned with a tilting axis of the furnace 24 so that the central axis of the charging opening 114 shares the tilting axis of the furnace 24. The combination of the round charging opening 114 and the round charging pan 104 of the connecting car 22 reduces the overall furnace height and minimizes the accumulation of slag beneath the pan 104 during the melting-refining process. The furnace 24 may further include a conventional rocker device, shown generally at 128, for facilitating the tilting of the furnace 24.

Figure 12:
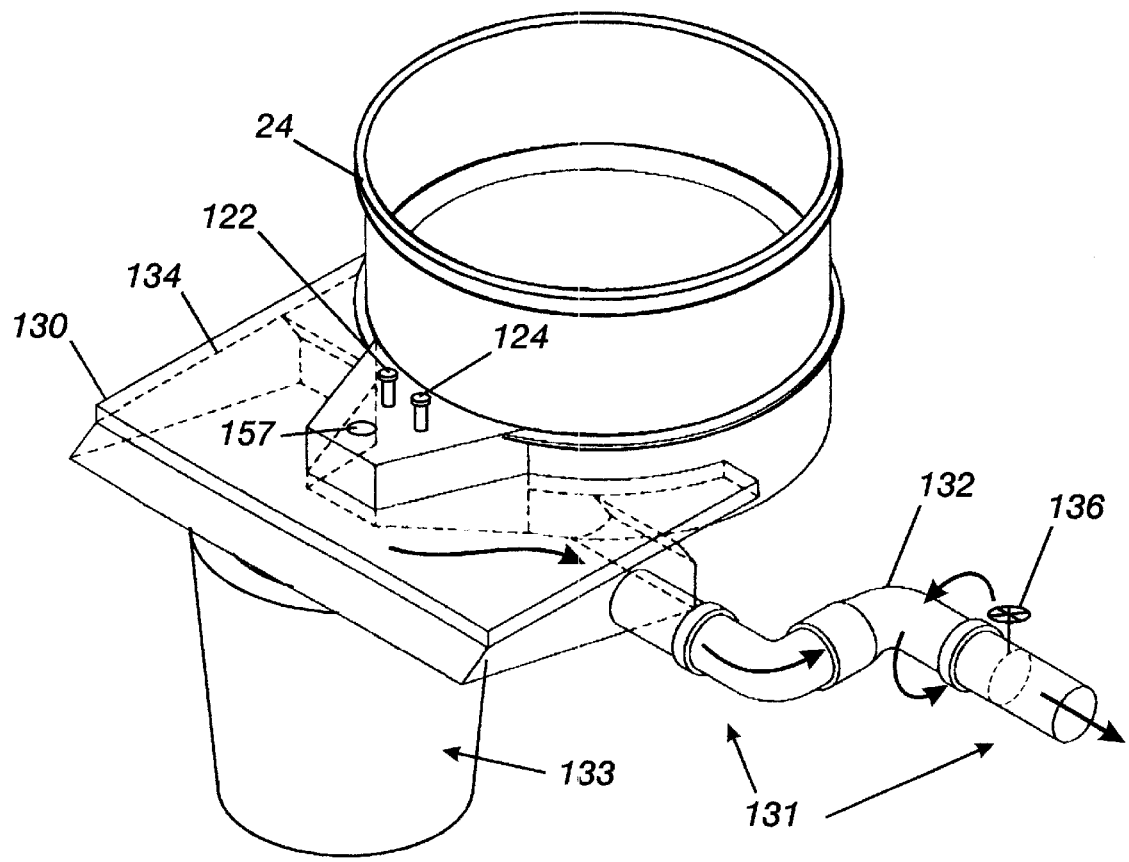
FIG. 12 is a perspective view of the electric arc furnace with the tapping canopy in accordance with one embodiment of the present invention, showing the flow of collected emissions.

FIG. 12 is a perspective view of the electric arc furnace 24 with a tapping canopy 130 in accordance with one embodiment of the present invention. The tapping canopy 130 is coupled to the dust disposal system 30 via a canopy duct 132. In one embodiment, the tapping canopy 130 is positioned on a furnace platform 134 adjacent a tapping portion 120 (FIG. 15) of the furnace 24. Emissions that are produced during tapping are collected by the tapping canopy 130 and directed to the dust disposal system 30 via the canopy duct 132. Selected portions of the canopy duct 132 may freely rotate about the longitudinal axis of the duct 132 in order to accommodate the tilting movement of the furnace 24 during tapping. For example, the canopy duct 132 includes rotational joints, shown generally at 131, that allow the canopy duct 132 to rotate. The canopy duct 132 includes a valve 136 for controlling the flow of emissions through the duct 132. Although the electric arc furnace 24 and the tapping canopy 130 are shown associated with a ladle 133, the electric arc furnace 24 and the tapping canopy 130 are not intended to be limited to association with the ladle 133 and may be associated with an intermediate metallurgical vessel 26 (FIG. 15).

Figure 13:
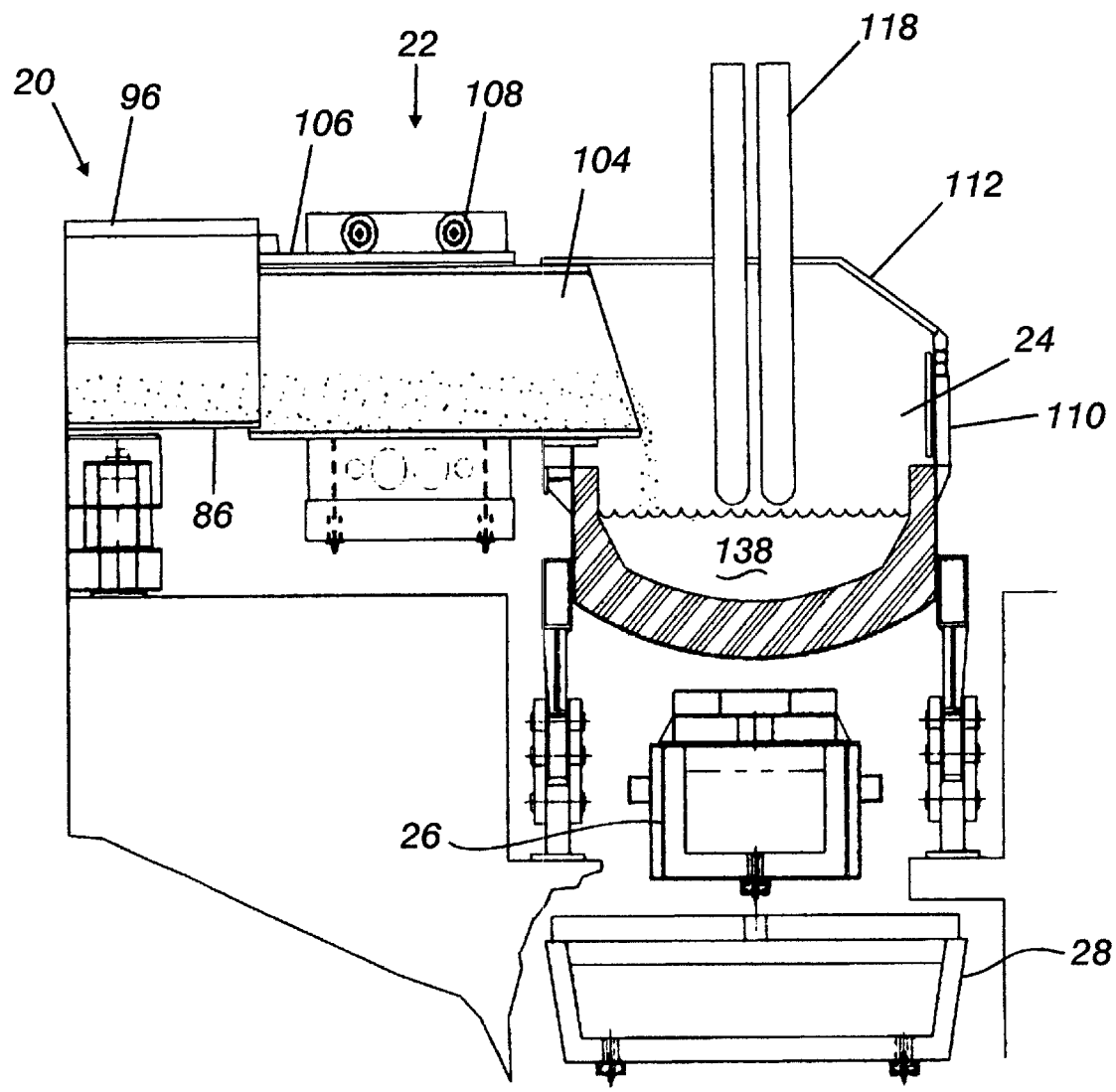
FIG. 13 is a vertical sectional view of the furnace with the connecting car in accordance with the present invention, showing the charging pan of the connecting car protruding into the furnace in the charging position.

FIG. 13 is a vertical sectional view of the furnace 24 and the connecting car 22 shown in FIG. 1, showing the charging pan 104 of the connecting car 22 protruding into the furnace 24 in a charging position. Charge material is transported from the preheater 20 to the connecting car 22 and into a furnace bath 138. The round configuration of the split entry of the furnace 24 and the water cooled pan 104 of the connecting car 22 allows for a reduction of the gap between the round pan 104 and the entrance opening 114, and therefore slag does not buildup on the outside of the pan 104. Additionally, the round configuration allows the connecting car 22 to be engaged with the furnace 24 during an entire campaign. In the current state of the art, conventional connecting cars must be retracted from the furnace when the furnace is drained.

The furnace 24 can be powered by either alternating current or direct current, or may be an induction furnace, or a plasma arc furnace, and has a lower profile than heretofore possible because the round charging opening 114 is at the top of the sidewall of the shell 110 and is partially in the furnace roof 112. The round split entry, with approximately half of the entry in the furnace roof 112, reduces the required furnace height, with resultant lowered energy costs.

FIG. 14 is a sectional view of the furnace roof 112 and the electrode sealing floating rings 140 in accordance with the present invention. The furnace roof center 116 is made of refractory and has at least one opening 142 for receiving an electrode 118 therethrough. When an electrode 118 is inserted through a corresponding electrode opening 142 in the furnace roof center 116, a gap, shown generally at 146, is formed between the electrode 118 and a wall 148 of the electrode opening 142. The gap 142 is necessary because the electrode 118 sways and exhibits lateral movement when in operation. The electrode sealing ring 140 seals the gap 142 around the electrode 118 in order to minimize the air intake into the furnace 24. In preferred embodiment, the electrode sealing ring 140 is made of refractory and has a predetermined inner diameter that provides a limited gap around and between the electrode 118 and the ring 140. The outer diameter of the ring 140 is preferably greater than the diameter of the electrode opening 142 to allow the ring to cover a substantial portion of the gap 142 between the electrode 118 and the electrode opening wall 148. The ring 140 is placed around an electrode 118 and positioned on the furnace roof center 116 and is free to follow any lateral displacement of the electrode 118. By minimizing the air intake into the furnace 24, the electrode sealing ring 140 assists in controlling the negative pressure created within the furnace 24 and preheater 20 thereby increasing the efficiency of the overall steel production process.

FIG. 15 is a perspective view of the furnace 24, electrode sealing floating rings 140, intermediate metallurgical vessel 26 and continuous casting device 28 in accordance with the present invention. The intermediate metallurgical vessel 26 is alignable with the molten metal discharge from the furnace 24 to be fed directly from a furnace discharge point 153 (FIG. 16) through a feed port 155. The continuous casting device 28 is alignable with the molten metal discharge from the intermediate metallurgical vessel 26 to be fed directly from the intermediate metallurgical vessel 26 through a feed port 159. Induction heating (not shown) may be added to the intermediate refining vessel 26 to maintain desired temperatures of the molten metal contained in the vessel 26. Alloying of the molten metal is accomplished in the intermediate metallurgical vessel 26, for example, by introducing in wire form aluminum, manganese, silicon and carbon into the vessel 26 through a alloying port 157. Hot intermediate product may be rolled directly from the continuous casting device 28. The intermediate metallurgical vessel 26 and continuous casting device 28 extend the continuity of the overall steel production process.

The intermediate metallurgical vessel 26 is coupled to a rail platform 150 in order to simplify and expedite the replacement of the intermediate metallurgical vessel 26. The rail platform 150 runs along an associated track 152. Additionally, the continuous casting device 28 is coupled to a rail platform 154 that runs along an associated track 156. By coupling the intermediate metallurgical vessel 26 and the continuous casting device 28 to rail platforms 150, 154 that travel along tracks 152, 156, the replacement of either the vessel 26 or the casting device 28 requires a simple withdrawal of the vessel 26 or casting device 28 and an exchange with a replacement intermediate metallurgical vessel (not shown) or a replacement continuous casting device (not shown) that is remotely located from the invented apparatus 10.

Figure 16:
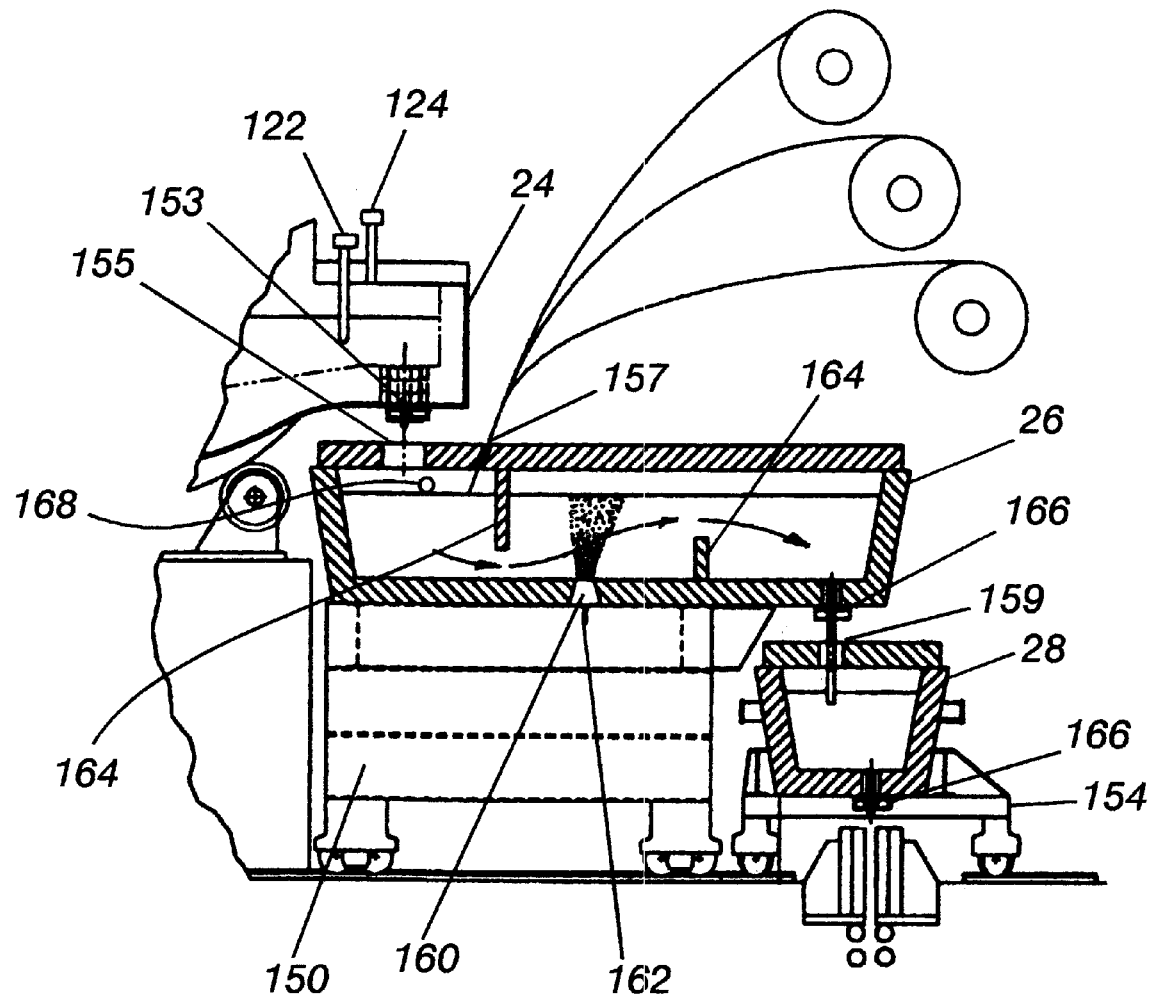
FIG. 16 is a cross-sectional view of a portion of the furnace, intermediate metallurgical vessel, and continuous casting device of FIG. 15, showing the steel refining-alloying in the intermediate metallurgical vessel.

FIG. 16 is a cross-sectional view of a portion of the furnace 24, intermediate metallurgical vessel 26, and continuous casting device 28 of FIG. 15, showing the flow of molten metal in the intermediate metallurgical vessel 26 to the continuous casting device 28. The intermediate metallurgical vessel 26 includes means for removing inclusions from the molten metal. A porous plug 160 is positioned in the bottom of the vessel having an gas injector 162 for introducing inert gas into the molten metal and at least two fixed baffles 164, or weirs, formed within the interior of the vessel 26. The inert gas injector 162 generates movement of the molten metal to encourage inclusions to rise to the surface of the molten metal. The baffles 164 control the flow profile of the molten metal contained within the vessel 26. The intermediate metallurgical vessel 26 further includes a deslagging port 168 positioned on a sidewall of the vessel 26. Although the intermediate metallurgical vessel 26 is shown in a box-like configuration, the intermediate metallurgical vessel 26 in not intended to be limited to such configuration and may have a cylindrical configuration. In the cylindrical configuration, supports are attached to the exterior surface of the cylindrical intermediate metallurgical vessel in order to prevent rotational movement of the vessel. The intermediate metallurgical vessel discharge and continuous casting device discharge are controlled by a stopper rod or a sliding gate 166.

FIG. 17 is a cross section view of an alternative embodiment of the present invention showing a melting furnace 170, a connecting car 174 having a connecting car pan 184 protruding into the furnace 170, a furnace discharge chamber 173, a furnace discharge mechanism, a bath exit orifice, shown generally at 188, from the furnace to the discharge chamber 173, and a continuous casting device 190. The alternative melting furnace 170 has a tilting mechanism, shown generally at 178, that has a pivoting point 176 coinciding with the discharging point of the liquid steel from the melting furnace 170. In the alternative embodiment shown in FIG. 17, the refining furnace 170 is provided with a feeding opening, shown generally at 172, for charging material into the furnace 170. The furnace 170 is supported by a frame having a pivotal axis that is generally aligned with a pouring nozzle 180 of the furnace. The furnace shell 181 is liftable by hydraulic cylinders 182. If it becomes necessary to lift or to pivot the furnace 170, the connecting car pan 184 is withdrawn a sufficient distance away from the furnace 170 such that the arcuate surfaces 186 at the entry or charging side of the furnace 170 are free as the furnace 170 pivots along an arc in that vicinity having the pivotal axis of the furnace 170.

The bath exit orifice 188, or siphoning hole, of the alternative melting furnace 170, separates melting slag from the liquid steel that is to be discharged from the melting furnace 170. For example, the siphoning hole 188 allows liquid steel but not slag to exit from the melting area of the furnace 170 and enter into the discharge chamber 173. In this embodiment, refining and alloying of the liquid steel is accomplished in the discharge chamber 173. Additionally, this embodiment maintains a substantially constant distance between the liquid steel discharging point 176 of the furnace 170 and the continuous casting device 190. This embodiment allows for more regulation of the steel flow from the furnace 170 because the furnace 170 is tilted to adjust the rate of steel flow from the furnace 170 to the continuous casting device 190. In contrast, the steel flow from the furnace 24 shown in FIGS. 1, 10, and 11, is preferably regulated by the throttling of a slide gate at the furnace discharge point 153.

FIG. 18 is a top view of the alternative melting furnace 170 of FIG. 17, showing the continuous casting device or tundish 190, a three-pronged vessel support 192, and furnace trunnions 194. FIG. 18a is a top view of the tundish 190 of FIG. 18. The tundish 190 includes a primary chamber 196 where the liquid steel is received from the furnace 170 through a first port 193. A second port 191 allows alloying wire to be introduced into the primary chamber 196 in order that the liquid steel may be deoxidized and alloyed therein. The tundish 190 also has a pair of secondary chambers 198 that are laterally positioned adjacent the primary chamber 196 and pair of baffles 195, or weirs, positioned between the secondary chambers 198 and the primary chamber 196. The baffles 195 control the flow profile of the liquid steel from the primary chamber 196 to the secondary chambers 198. Liquid steel that has been deoxidized and alloyed in the primary chamber 196 flows to the secondary chambers 198 where nozzles are located that feed the liquid steel to a caster mold.

The three-pronged vessel support 192 allows for a quick and simple interchange of the continuous casting device 190 during a replacement operation. During the replacement operation, the continuous casting device 190 is rotated away from the furnace 170, and a replacement continuous casting device, shown in dotted lines, is simply rotated into alignment with the furnace 170.

SUMMARY OF THE ACHIEVEMENT OF THE OBJECTS OF THE INVENTION

From the foregoing, it is readily apparent that I have invented an improved apparatus for preheating, melting, refining, casting and rolling steel that conserves energy and protects the environment. The present invention provides a method and apparatus for electric steel production that extends the continuity of the steel production operation to include charging, preheating of charge materials, refining of steel, steel metallurgy, casting and hot rolling intermediate product and ensures the absolute continuity of the liquid steel to a continuous casting device. The present invention provides a method and apparatus for electric steel production that abates emission without further energy consumption. The present invention provides a method and apparatus for electric steel production that has significant reductions in electrical energy requirement, electrode consumption, manpower and process dust disposal. The present invention provides a method and apparatus for electric steel production that maintains the homogeneity of charge material introduced into the furnace.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. Apparatus for continuous preheating, melting, refining and casting of steel, said apparatus comprising:

a belt conveyor positioned in a charging area for introducing minute charge materials and slag formers;

a charge conveyor for receiving charge materials;

a dynamic gas seal having a material entry end and a material exit end, said gas seal coupled to said charge conveyor;

a preheater coupled to the material exit end of said dynamic gas seal and communicating with said charge conveyor for preheating the charge materials on the charge conveyor;

a connecting means removably coupled to said preheater and said charge conveyor for directly feeding charge materials into a furnace bath;

an electric arc furnace for melting and refining metallic charge therein;

means for tilting said furnace;

a directly fed intermediate metallurgical vessel positionable for receiving molten metal discharged from said furnace; and a continuous casting device for receiving refined alloyed steel from said intermediate metallurgical vessel.

2. An apparatus according to claim 1 further comprising means for leveling charge materials on said conveyor.

3. An apparatus according to claim 1 wherein said belt conveyor includes means for varying the length of said belt conveyor.

4. An apparatus according to claim 1 wherein said charge conveyor is an elongated vibrating channel.

5. An apparatus according to claim 1 wherein said charge conveyor includes means for maintaining a homogeneous scrap bed height.

6. An apparatus according to claim 1 wherein said charge conveyor comprises:

a charging section preceding said dynamic gas seal for loading charge material at a position proximal to said charge conveyor and transporting the charge material towards and through said dynamic seal; and a preheating section extending from said dynamic gas seal toward said furnace for transporting preheated charge material from said dynamic seal toward said furnace.

7. An apparatus according to claim 6 wherein said charging section comprises:

a conveyor pan for receiving charge materials, said conveyor pan having sidewalls, said sidewalls having a pre-determined height; and a charging skirt positioned peripherally of said sidewalls, said charging skirt having a skirt wall height of about the sidewall height;

wherein said charging skirt allows charge materials to be accessed from said conveyor pan by raw material handling equipment from a position proximal to the charging section of said charge conveyor.

8. An apparatus according to claim 6 further comprising a self-positioning charging cart engaging said conveyor.

9. An apparatus according to claim 8 wherein said self-positioning charging cart comprises:

an inclined skirt for directing charge materials onto said conveyor pan;

means for guiding the movement of said charging cart along the length of the charging section of the charge conveyor; and means for determining the location of the end of a scrap bed in said charge conveyor and positioning said charging cart adjacent the end of the scrap bed.

10. An apparatus according to claim 9 wherein said guiding means comprises:

a pair of rails mounted on the charging section of said charge conveyor;

a set of rail wheels mounted on the bottom of said charging cart for coupling with said pair of rails; and means for displacing said charging cart along said pair of rails.

11. An apparatus according to claim 6 wherein said preheater comprises:

a support extending along the length of said preheating section of said conveyor; and a cover removably positioned over said preheating section of said conveyor, said cover forming a preheating chamber with said support;

wherein said preheater conducts off gas from said furnace through said preheating chamber.

12. An apparatus according to claim 11 wherein said preheater further comprises:

at least one deflector pivotally attached to said cover of said preheater for forcing hot off-gas downwardly into charge materials on said conveyor.

13. An apparatus according to claim 11 wherein said cover of said preheater includes at least three removable sections.

14. An apparatus according to claim 11 further comprising means for maintaining a progressively changing atmosphere within said preheating chamber from reducing at a material discharge end of said preheater to oxidizing at a material entry end of said preheater.

15. An apparatus according to claim 1 wherein said furnace comprises:

a removable furnace roof;

a shell having a sidewall;

means for lifting and pivoting said furnace roof away from said sidewall of said shell;

a furnace charging opening formed in an upper portion of said shell and a portion of said roof;

a tapping opening formed in a tapping portion of said furnace; and a hearth.

16. An apparatus according to claim 15 further comprising an electrode sealing means.

17. An apparatus according to claim 15 wherein said connecting means comprises:

a platform;

a connecting car positionable on said platform, said connecting car having a water cooled charging pan adapted to be received into said furnace charging opening.

18. An apparatus according to claim 17 wherein said furnace charging opening and said water cooled pan of said connecting car have a substantially round cross section.

19. An apparatus according to claim 17 wherein said connecting and sealing means comprises:

a pair of rails mounted on said elevated platform; and a set of rail wheels mounted on said connecting car.

20. An apparatus according to claim 16 wherein said furnace roof comprises a center made of refractory, said center having openings for receiving electrodes; and wherein said electrode sealing means comprises at least one electrode sealing ring for coupling with an electrode inserted through said openings, said electrode sealing ring made of refractory.

21. An apparatus according to claim 15 further comprising a dust removal system comprising:

a post combustion chamber connected to said preheater;

means for reducing the temperature of the off gases from said furnace;

a baghouse coupled to both of said boiler and said quencher for filtering emissions from said furnace;

at least one blower for urging the flow of the off gases toward said bag house; and a damper for selectively directing the flow of off gases to said quencher and said boiler.

22. An apparatus according to claim 21 wherein said reducing means is a boiler coupled to said post combustion chamber for quenching the off gases from said furnace.

23. An apparatus according to claim 21 wherein said reducing means is a quencher coupled to said post combustion chamber.

24. An apparatus according to claim 21 further comprising a tapping canopy attached to the tapping portion of said furnace and connected to said dust removal system.

25. An apparatus according to claim 1 wherein said intermediate metallurgical vessel comprises:

means for removing inclusions from the molten metal contained within said vessel; and means for maintaining a pre-determined temperature of molten metal contained within said vessel.

26. An apparatus according to claim 1 further comprising a de-duster attached to said charge conveyor for removing particles from the charge material.

27. A method for continuously preheating, melting, refining and casting of steel comprising:

preheating charge materials;

continuously feeding said charge materials to the interior of an electric arc furnace, through a connecting means removably coupled to a preheater and a charge conveyor for directly feeding said charge materials into a furnace bath;

continuously refining said charge materials in the furnace to form molten steel;

discharging the molten steel directly to a continuous casting device without an intermediate ladle;

conducting ladle metallurgy in the continuous casting device;

teeming the molten metal directly from the continuous casting device into a continuous casting mold in which the molten steel commences solidification;

withdrawing said partially solidified steel from said mold;

cooling said withdrawn steel to form a billet;

equalizing the temperature throughout said billet; and rolling said billet to form a desired rolled steel product.

\* \* \* \* \*